United States Patent
Yun et al.

(10) Patent No.: US 7,664,192 B2
(45) Date of Patent: Feb. 16, 2010

(54) APPARATUS AND METHOD FOR MINIMIZING A PAPR IN AN OFDM COMMUNICATION SYSTEM

(75) Inventors: Sung-Ryul Yun, Suwon-si (KR);
Chan-Byoung Chae, Seoul (KR);
Hong-Sil Jeong, Suwon-si (KR);
Dong-Seek Park, Yongin-si (KR);
Won-Il Roh, Yongin-si (KR); Jae-Yoel Kim, Gunpo-si (KR); Pan-Yuh Joo, Yongin-si (KR); Jeong-Tae Oh, Yongin-si (KR); Kyun-Byoung Ko, Goyang-si (KR)

(73) Assignee: Samsung Electronics Co., Ltd (KR)

( * ) Notice: Subject to any disclaimer, the term of this patent is extended or adjusted under 35 U.S.C. 154(b) by 651 days.

(21) Appl. No.: 11/247,787

(22) Filed: Oct. 11, 2005

(65) Prior Publication Data
US 2006/0078066 A1 Apr. 13, 2006

(30) Foreign Application Priority Data
Oct. 11, 2004 (KR) .................. 10-2004-0080905

(51) Int. Cl.
*H04B 7/02* (2006.01)
(52) U.S. Cl. ..................................... 375/267
(58) Field of Classification Search ............... 375/267
See application file for complete search history.

(56) References Cited

U.S. PATENT DOCUMENTS

2006/0078066 A1* 4/2006 Yun et al. ............... 375/299

OTHER PUBLICATIONS

IEEE 802.16 Broadband Wireless Access Working group, Sung-Eun Park et al.*
Sung-Eun Park et al., Tone Reservation Method for PAPR Reduction Scheme, Oct. 31, 2003.

* cited by examiner

*Primary Examiner*—David C Payne
*Assistant Examiner*—Tanmay K Shah
(74) *Attorney, Agent, or Firm*—The Farrell Law Firm, LLP

(57) ABSTRACT

A transmitter for minimizing a PAPR in OFDM communication system. The transmitter includes: a precoder for coding input symbols so that a signal rotation is generated, and generating a complex vector including the coded symbols; an encoder for performing a frequency-space mapping for the symbols generated as the complex vector according to a predetermined scheme; a random mapper for randomly mapping the symbols for which the frequency-space mapping has been performed on a frequency plane through at least one transmit antenna; an Inverse Fast Fourier Transform (IFFT) unit for performing an IFFT for the symbols for which the frequency-space mapping has been performed; and a gradient algorithm unit for receiving IFFTed signals from the IFFT unit and reducing the PAPR.

11 Claims, 13 Drawing Sheets

APPARATUS AND METHOD FOR MINIMIZING A PAPR IN AN OFDM COMMUNICATION SYSTEM

PRIORITY

This application claims priority to an application entitled "Apparatus and Method for minimizing PAPR in OFDM communication system" filed in the Korean Intellectual Property Office on Oct. 11, 2004 and assigned Serial No. 2004-80905, the contents of which are incorporated herein by reference.

BACKGROUND OF THE INVENTION

1. Field of the Invention

The present invention relates generally to an apparatus and a method for transmit antenna diversity in a wireless communication system, and more particularly to an apparatus and a method for minimizing a Peak-to-Average Power Ratio (PAPR) in an Orthogonal Frequency Division Multiplexing (OFDM) communication system using a multiple transmit antenna.

2. Description of the Related Art

Generally, the most fundamental issue in wireless communication lies in how efficiently and reliably data can be transmitted through a channel. The next generation multimedia mobile communication system, which has been actively researched in recent years, requires a high speed communication system capable of processing and transmitting various information such as images and wireless data, different than an initial communication system providing a voice-based service. Accordingly, it is necessary to improve system efficiency using a channel coding scheme proper for a system.

Different from wire channel environments, wireless channel environments in a mobile communication system are subject to loss of information due to an unavoidable error caused by various factors such as multi-path interference, shadowing, electric wave attenuation, time-varying noise, interference, and fading. Further, this information loss deteriorate performance of the mobile communication system because it may actually cause a serious distortion in transmitted signals. Accordingly, in order to reduce the information loss, it is necessary to improve the reliability of a system by means of various error control techniques based on characteristics of channels. From among these error control techniques, an error correcting code is commonly used.

In order to remove the instability of communication caused by fading, a diversity scheme is used. The diversity scheme may be classified into a time diversity scheme, a frequency diversity scheme, and an antenna diversity scheme, i.e., a space diversity scheme. The antenna diversity scheme is a scheme using multiple antennas, which may be classified into a receive antenna diversity scheme using a plurality of receive antennas for application, a transmit antenna diversity scheme using a plurality of transmit antennas for application, and a Multiple Input Multiple Output (MIMO) scheme using a plurality of receive antennas and a plurality of transmit antennas for application. The MIMO scheme is a kind of Space-Time Coding (STC) scheme. The STC scheme transmits signals encoded by a preset encoding scheme through a plurality of transmit antennas, thereby expanding a time-domain encoding scheme to a space domain and achieving reduced error rate.

FIG. 1 is a block diagram schematically illustrating a conventional transmitter in a mobile communication system using an SFBC scheme, i.e., an OFDM communication system using four transmit antennas. Referring to FIG. 1, the transmitter includes a precoder 100, an encoder 102, a plurality of OFDM modulators 104, 106, 108, and 110, and a plurality of transmit antennas 112, 114, 116, and 118.

The precoder 100 codes $N_t$ input symbols, e.g., four symbols $x_1$ to $x_4$, so that a signal rotation is generated on a signal space, and outputs vectors $r_1$ to $r_4$ including the four coded symbols. More specifically, the precoder 100 codes the input symbols into a precoding matrix so as to generate a complex vector r.

The encoder 102 receives the output from the precoder 100, bundles the four symbols into two pairs to vectors ($[r_1, r_2]$, $[r_3, r_4]$), wherein each pair includes two symbols or elements. Further, the encoder 102 encodes each vector by an Alamouti scheme and performs a frequency-space mapping for the encoded vectors. Herein, an encoding matrix based on the operation of the encoder 102 may be expressed as shown in Equation (1) below.

$$\begin{bmatrix} r_1 & -r_2^* & 0 & 0 \\ r_2 & r_1^* & 0 & 0 \\ 0 & 0 & r_3 & -r_4^* \\ 0 & 0 & r_4 & r_3^* \end{bmatrix} \quad (1)$$

In the encoding matrix of Equation (1), the number of columns corresponds to the number of transmit antennas and the number of rows corresponds to the number of used sub-carriers. The encoder 102 generates the four antenna signals (or vectors) $[r_1, r_2, 0, 0]$, $[-r_2^*, r_1^*, 0, 0]$, $[0, 0, r_3, r_4]$ and $[0, 0, -r_4^*, r_3^*]$, and outputs the antenna signals to the corresponding OFDM modulators 104, 106, 108 and 110, respectively. For example, the $[r_1, r_2, 0, 0]$ is output to the first OFDM modulator 104, the $[-r_2^*, r_1^*, 0, 0]$ is output to the second OFDM modulator 106, the $[0, 0, r_3, r_4]$ is output to the third OFDM modulator 108, and the $[0, 0, -r_4^*, r_3^*]$ is output to the fourth OFDM modulator 110.

The first OFDM modulator 104 allocates the symbols $[r_1, r_2, 0, 0]$ from the encoder 102 to four adjacent sub-carriers, performs an Inverse Fast Fourier Transform (IFFT), converts IFFTed signals into Radio Frequency (RF) signals, and transmits the RF signals through the first transmit antenna 112. The second OFDM modulator 106 allocates the symbols $[-r_2^*, r_1^*, 0, 0]$ from the encoder 102 to four adjacent sub-carriers, performs the IFFT, converts IFFTed signals into RF signals, and transmits the RF signals through the second transmit antenna 114. The third OFDM modulator 108 allocates the symbols $[0, 0, r_3, r_4]$ from the encoder 102 to four adjacent sub-carriers, performs the IFFT, converts IFFTed signals into RF signals, and transmits the RF signals through the third transmit antenna 116. The fourth OFDM modulator 110 allocates the symbols $[0, 0, -r_4^*, r_3^*]$ from the encoder 102 to four adjacent sub-carriers, performs the IFFT, converts IFFTed signals into RF signals, and transmits the RF signals through the fourth transmit antenna 118.

The symbols transmitted through the first to the fourth transmit antenna 112, 114, 116 and 118 are shown on a time-frequency plane as illustrated in (a), (b), (c) and (d) of FIG. 1.

As illustrated in FIG. 1, the SFBC scheme according to the prior art is characterized in that it performs the frequency-space mapping for the precoded symbols by the Alamouti scheme and transmits the symbols for which the frequency-space mapping has been performed through the antennas during one time interval.

In the MIMO-OFDM communication system using the scheme as described above, a high PAPR may be caused by the afore-described multiple carrier modulation. That is, because data are transmitted using multiple carriers in the MIMO-OFDM scheme, the final OFDM signals have amplitude obtained by summing up amplitudes of each carrier. Accordingly, variation width of the amplitude is wide. Further, when the carriers have the same phases, the variation width has a very large value. Therefore, the prior art deviates from a linear operation range of a high power linear amplifier and signals having passed through the high power linear amplifier have distortion. The high power linear amplifier must operate in a nonlinear range in order to obtain maximum power. However, due to the distortion as described above, a back-off scheme is used, which lowers input power and operates the high power linear amplifier in a linear range.

The back-off scheme drops the operation point of the high power amplifier in order to reduce the signal distortion. However, as the value of the back-off increases, power consumption may also increase and thus the efficiency of an amplifier may deteriorate greatly. Therefore, signals having a high PAPR deteriorate the efficiency of a linear amplifier.

Further, in a nonlinear amplifier, an operation point belongs to a nonlinear range, such that nonlinear distortion may occur. Additionally, a problem including a mutual modulation among carriers and a spectrum emission, etc., may occur.

SUMMARY OF THE INVENTION

Accordingly, the present invention has been designed to solve the above and other problems occurring in the prior art.

It is an object of the present invention to provide an apparatus and a method for minimizing a PAPR using a Tone Reservation (TR) scheme in an OFDM communication system.

It is another object of the present invention to provide an apparatus and a method for minimizing a PAPR by adding a gradient algorithm without changing a basic construction in an OFDM communication system.

It is further another object of the present invention to provide a superior PAPR solution of a tone reservation scheme for minimizing a PAPR by randomly mapping a sub-carrier of a space frequency block code in an OFDM communication system.

In order to accomplish the above and other objects, according to one aspect of the present, there is provided a transmitter for minimizing a Peak-to-Average Power Ratio (PAPR) in an Orthogonal Frequency Division Multiplexing (OFDM) communication system. The transmitter includes: at least one transmit antenna; a precoder for coding input symbols so that a signal rotation is generated, and generating a complex vector including the coded symbols; an encoder for performing a frequency-space mapping for the symbols generated as the complex vector according to a predetermined scheme; an Inverse Fast Fourier Transform (IFFT) unit for performing an IFFT for the symbols for which the frequency-space mapping has been performed; and a gradient algorithm unit for receiving IFFTed signals from the IFFT unit and reducing the PAPR.

According to another aspect of the present, there is provided a transmitter for minimizing a Peak-to-Average Power Ratio (PAPR) in an Orthogonal Frequency Division Multiplexing (OFDM) communication system. The transmitter includes at least one transmit antenna; a precoder for coding input symbols so that a signal rotation is generated, and generating a complex vector including the coded symbols; an encoder for performing a frequency-space mapping for the symbols generated as the complex vector according to a predetermined scheme; a random mapper for randomly mapping the symbols for which the frequency-space mapping has been performed on a frequency plane through said at least one transmit antenna; an Inverse Fast Fourier Transform (IFFT) unit for performing an IFFT for the symbols for which the frequency-space mapping has been performed; and a gradient algorithm unit for receiving IFFTed signals from the IFFT unit and reducing the PAPR.

According to further another aspect of the present, there is provided a transmitter for minimizing a Peak-to-Average Power Ratio (PAPR) in an Orthogonal Frequency Division Multiplexing (OFDM) communication system. The transmitter includes at least one transmit antenna; a precoder for coding input symbols so that a signal rotation is generated, and generating a complex vector including the coded symbols; an encoder for separating the symbols output from the precoder so as to generate a predetermined number of vectors, encoding the generated vectors by a predetermined scheme, performing a frequency-space mapping for the encoded vectors, and randomly mapping the symbols for which the frequency-space mapping has been performed on a frequency plane through said at least one transmit antenna; an Inverse Fast Fourier Transform (IFFT) unit for performing an IFFT for the symbols for which the frequency-space mapping has been performed; and a gradient algorithm unit for receiving IFFTed signals from the IFFT unit and reducing the PAPR.

According to still another aspect of the present, there is provided a receiver for minimizing a Peak-to-Average Power Ratio (PAPR) in an Orthogonal Frequency Division Multiplexing (OFDM) communication system. The receiver includes at least one reception antenna; a plurality of OFDM modulators for converting signals received through said at least one reception antenna into baseband signals, performing a Fast Fourier Transform (FFT) for the baseband signals, performing an OFDM demodulation for the FFTed signals, and outputting OFDM demodulated data; a channel estimator for receiving the OFDM demodulated data and estimating channel coefficients representing a channel gain; a channel response matrix generator for generating a channel response matrix by means of the channel coefficients from the channel estimator; a signal combiner for combining the OFDM demodulated data from the OFDM demodulators with the channel response matrix generated by the channel response matrix generator according to a predetermined rule, thereby outputting a vector with a predetermined size; and a first and a second signal determiner for performing maximum likelihood decoding by means of the channel response matrix generated by the channel response matrix generator and the vector with the predetermined size output from the signal combiner, thereby estimating and outputting symbols transmitted from a transmitter.

According to yet another aspect of the present, there is provided a receiver for minimizing a Peak-to-Average Power Ratio (PAPR) in an Orthogonal Frequency Division Multiplexing (OFDM) communication system. The receiver includes: at least one reception antenna; a plurality of OFDM modulators for converting signals received through said at least one reception antenna into baseband signals, performing a Fast Fourier Transform (FFT) for the baseband signals, performing an OFDM demodulation for the FFTed signals, and outputting OFDM demodulated data; a random sequence unit for storing predetermined random sequences, and separating signals of adjacent sub-carriers into predetermined groups based on the stored random sequences; a channel estimator for receiving signals output from the random sequence unit and estimating channel coefficients representing a channel gain; a channel response matrix generator for generating a channel response matrix by means of the channel coefficients from the channel estimator; a signal combiner for combining the signals output from the random sequence unit with the channel response matrix generated by the channel response matrix generator according to a predetermined rule, thereby outputting a vector with a predetermined size; and a first and a second signal determiner for performing maximum likelihood decoding by means of the channel response matrix generated by the channel response matrix generator and the vector with the predetermined size output from the signal combiner, thereby estimating and outputting symbols transmitted from a transmitter.

According to yet another aspect of the present, there is provided a transmission method in a transmitter for minimizing a Peak-to-Average Power Ratio (PAPR) in an Orthogonal Frequency Division Multiplexing (OFDM) communication system, the transmitter including at least one transmit antenna. The method includes the steps of: receiving a data sequence to be transmitted; generating a predecoded symbol sequence with the received data sequence through precoding using a preset precoding matrix; grouping symbols constituting the predecoded symbol sequence into groups having a predetermined number of symbols so as to generate a predetermined number of vectors; performing a frequency-space mapping for the generated vectors according to a predetermined scheme; allocating signals for which the frequency-space mapping has been performed to sub-carriers, performing an Inverse Fast Fourier Transform (IFFT); outputting IFFTed signals; receiving the IFFTed signals and reducing the PAPR; and transmitting signals having the reduced PAPR through said at least one transmit antenna.

According to yet another aspect of the present, there is provided a transmission method in a transmitter for minimizing a Peak-to-Average Power Ratio (PAPR) in an Orthogonal Frequency Division Multiplexing (OFDM) communication system, the transmitter including at least one transmit antenna. The method includes the steps of: receiving a data sequence to be transmitted; generating a predecoded symbol sequence with the received data sequence through preceding using a preset precoding matrix; performing a frequency-space mapping for the generated symbol sequence according to a predetermined scheme; randomly mapping symbols for which the frequency-space mapping has been performed on a frequency plane through said at least one transmit antenna; performing an Inverse Fast Fourier Transform (IFFT) for the symbols for which the frequency-space mapping has been performed; outputting IFFTed signals; receiving the IFFTed signals; reducing the PAPR; and transmitting signals having the reduced PAPR through said at least one transmit antenna.

According to yet another aspect of the present, there is provided a transmission method in a transmitter for minimizing a Peak-to-Average Power Ratio (PAPR) in an Orthogonal Frequency Division Multiplexing (OFDM) communication system, the transmitter including at least one transmit antenna. The method includes the steps of: receiving a data sequence to be transmitted, and generating a predecoded symbol sequence with the received data sequence through preceding using a preset preceding matrix; separating the generated predecoded symbol sequence to generate a predetermined number of vectors; encoding the generated vectors according to a predetermined scheme; randomly mapping the encoded vectors on a frequency plane; performing an Inverse Fast Fourier Transform (IFFT) for the symbols for which the frequency-space mapping has been performed, and outputting IFFTed signals; receiving the IFFTed signals; reducing the PAPR; and transmitting signals having the reduced PAPR through said at least one transmit antenna.

According to yet another aspect of the present, there is provided a reception method in a receiver for minimizing a Peak-to-Average Power Ratio (PAPR) in an Orthogonal Frequency Division Multiplexing (OFDM) communication system, the receiver including at least one receive antenna. The method includes the steps of: converting signals received through said at least one receive antenna to baseband signals; performing a Fast Fourier Transform (FFT) for the baseband signals; performing an OFDM demodulation for the FFTed signals; outputting OFDM demodulated signals; estimating channel coefficients representing a channel gain between a transmitter and the receiver by means of the OFDM demodulated signals; generating a channel response matrix by means of the estimated channel coefficients; generating a vector with a predetermined size by combining the OFDM demodulated signals with the channel response matrix according to a predetermined rule; and estimating transmission symbols by performing maximum likelihood decoding using the channel response matrix and the vector with the predetermined size.

According to yet another aspect of the present, there is provided a reception method in a receiver for minimizing a Peak-to-Average Power Ratio (PAPR) in an Orthogonal Frequency Division Multiplexing (OFDM) communication system, the receiver including at least one receive antenna. The method includes the steps of: converting signals received through said at least one receive antenna to baseband signals; performing a Fast Fourier Transform (FFT) for the baseband signals; performing an OFDM demodulation for the FFTed signals; outputting OFDM demodulated signals; separating signals of adjacent sub-carriers into predetermined groups through a random sequence initially stored in a system; outputting the groups; estimating channel coefficients representing a channel gain between a transmitter and the receiver by means of the OFDM demodulated signals and output signals through the random sequence; generating a channel response matrix by means of the estimated channel coefficients; generating a vector with a predetermined size by combining the OFDM demodulated signals with the channel response matrix according to a predetermined rule; and estimating transmission symbols by performing maximum likelihood decoding using the channel response matrix and the vector with the predetermined size.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
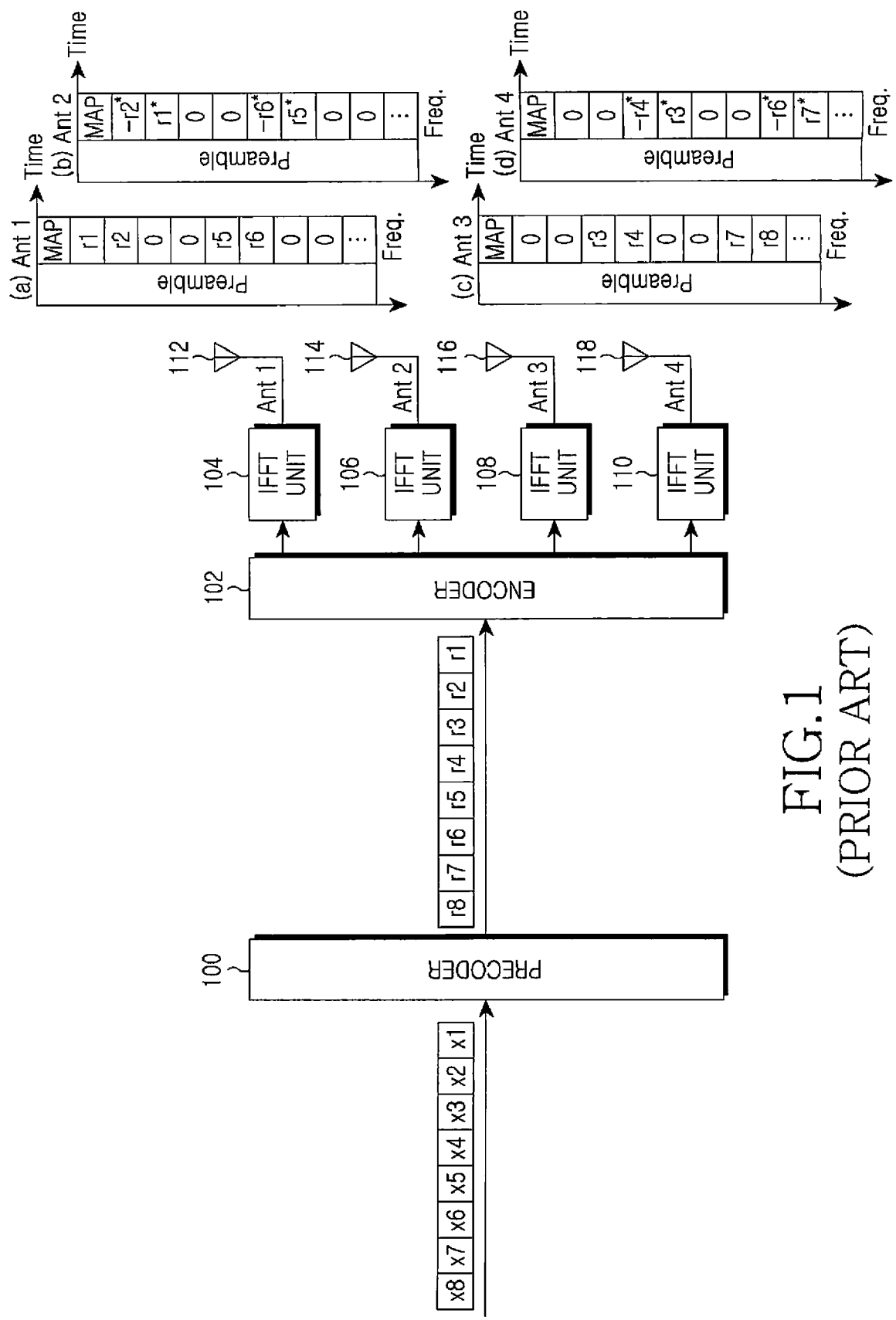
FIG. 1 is a block diagram schematically illustrating a conventional transmitter in a mobile communication system using an SFBC scheme.

Hereinafter, preferred embodiments according to the present invention will be described with reference to the accompanying drawings. In the description below, many particular items, such as detailed elements, are shown, but these are provided for helping the general understanding of the present invention. It will be apparent to those skilled in the art that the particular items can be modified or varied within the scope of the present invention.

Basically, the present invention proposes an Orthogonal Frequency Division Multiplexing (OFDM) Space Frequency Block Coding (SFBC) scheme in a mobile communication system using a multiple transmit antenna scheme. More specifically, the present invention proposes an SFBC scheme for effectively reducing a Peak-to-Average Power Ratio (PAPR) in an SFB coding/decoding apparatus.

Typically, an OFDM communication system must use signals having a low PAPR in order to guarantee the normal system performance. More specifically, because the OFDM communication system is a multi-carrier communication system and uses a plurality of carriers, i.e., a plurality of sub-carriers, orthogonality of each sub-carrier becomes important. Accordingly, a phase is set for mutually orthogonal sub-carriers.

When the phase shifts in a signal transmission/reception process through the sub-carriers, signals between the sub-carriers may overlap. In this case, because the amplitude of signals overlapped by the phase shift deviates from a linear range of an amplifier in the OFDM communication system and it makes normal signal transmission/reception impossible, the OFDM communication system uses signals having a minimum PAPR.

The PAPR minimization in the OFDM communication system is a very important issue in improvement of system performance. Accordingly, much research for minimizing the PAPR has been pursued.

A typical scheme for minimizing the PAPR includes a clipping scheme, a block coding scheme, a phase adjustment scheme, a Tone Reservation (TR) scheme, etc. According to the clipping scheme, a linear operation range of an amplifier is preset as a predetermined clipping value, which is a reference value. When the amplitude of predetermined input signals exceeds the preset clipping value, the excess is forcedly clipped according to the clipping value, so that a PAPR can be reduced. Therefore, it is very simple to realize the clipping scheme. However, in the clipping scheme, in-band distortion occurs due to a nonlinear operation, such that Inter-Symbol Interference (ISI) may occur and a Bit Error Rate (BER) may increase. Further, Inter-Channel Interference (ICI) occurs due to out-band clipping noise, such that spectrum efficiency may deteriorate.

The block coding scheme transmits extra carriers after applying a coding scheme in order to reduce the PAPR of total carrier signals. The block coding scheme corrects errors caused by coding and also reduces the PAPR without signal distortion. However, when a sub-carrier is large, spectrum efficiency deteriorates greatly and the size of a look-up table or a generation matrix increases, such that the complexity increases. Therefore, the amount of calculation may increase.

Commonly, the phase adjustment scheme may be classified into two schemes, i.e., a Partial Transmit Sequence (PTS) scheme and a SeLective Mapping (SLM) scheme. The PTS scheme splits input data into M number of sub-blocks, performs an L-point Inverse Fast Fourier Transform (IFFT) for each sub-block, multiplies each sub-block by a phase factor for minimizing a PAPR, and sums up the sub-blocks after the multiplication for transmission. However, the PTS scheme requires IFFT processes corresponding to the number M of sub-blocks and the amount of calculation for calculating the phase factor enormously increases with the increase in the number of sub-blocks, such that high speed information transmission is difficult.

The SLM scheme multiplies M number of the same data blocks by different phase sequences with a statistically independent length N, and selects one having the smallest PAPR for transmission from among results of the multiplication. This SLM scheme requires M number of IFFT processes, but it can significantly reduce the PAPR and can be applied to a random number of carriers. However, the PTS scheme and the SLM scheme must transmit additional information for rotation factors to a receiver in order to restore data. Further, when the additional information must be transmitted to the receiver as described above, the communication scheme becomes complicated and all information of OFDM symbols at a corresponding time is regarded as being erroneous.

The TR scheme designates certain tones not transmitting data from among total sub-carriers. That is, because a receiver ignores said certain tones not transmitting information signals and restores information signals for only the other tones, the receiver has a more simplified structure.

Representatively, a gradient algorithm uses the TR scheme. More specifically, the gradient algorithm applies the aforedescribed clipping scheme to the TR scheme. That is, the gradient algorithm generates signals having impulse characteristics by means of tones not transmitting information signals, and then clips IFFT output signals based on the generated signals having the impulse characteristics. When the generated signals having the impulse characteristics are added to the IFFT output signals, data distortion occurs only in certain tones not transmitting information and the data distortion does not occur in a frequency domain excluding said certain tones.

Hereinafter, a detailed description for a preferred method and apparatus for minimizing the PAPR by applying the TR scheme of the afore-described PAPR reduction scheme to an SFBC MIMO-OFDM system according to the present invention will be described.

1. Transmitter Structure

Figure 2:
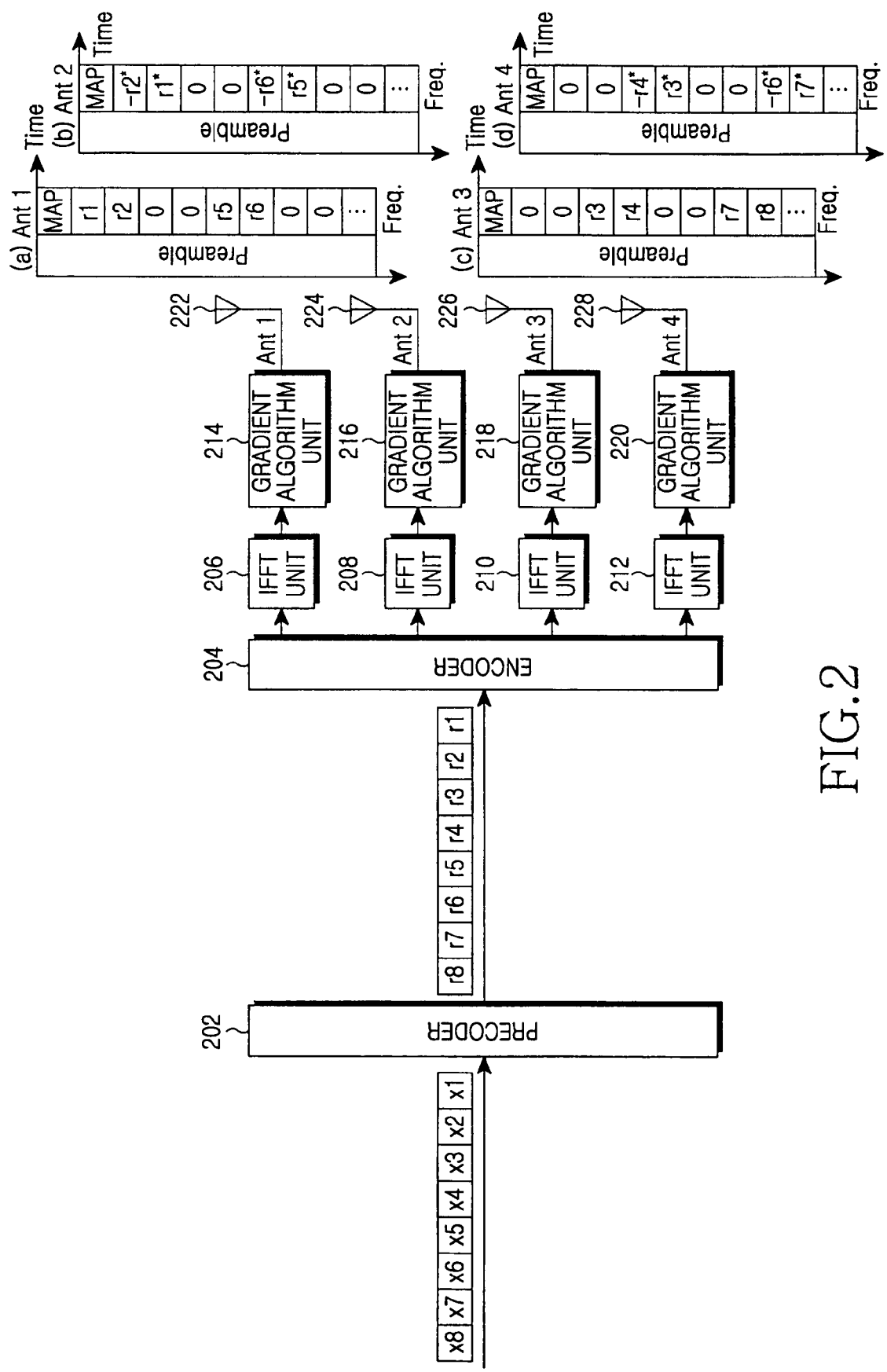
FIG. 2 is a block diagram schematically illustrating a transmitter in an OFDM mobile communication system using an SFBC scheme according to an embodiment of the present invention.

FIG. 2 is a block diagram schematically illustrating a transmitter according to an embodiment of the present invention. However, before describing FIG. 2, the transmitter according to the present invention uses $N_t$ transmit antennas and utilizes an SFBC scheme. In the following description, four transmit antennas are described as a detailed example. However, in the transmitter of the present invention, the number of antennas is not limited to this example.

Referring to FIG. 2, the transmitter according an embodiment of the present invention includes a precoder 202, an encoder 204, a plurality of OFDM modulators 206, 208, 210, and 212, a plurality of gradient algorithm units 214, 216, 218, and 220 for PAPR reduction, and a plurality of transmit antennas 222, 224, 226, and 228. The precoder 202 codes four input symbols $x_1$ to $x_4$ into a preceding matrix so that a signal rotation is generated on a signal space, and outputs a complex vector r including four symbols $r_1$ to $r_4$. The encoder 204 receives the four symbols from the precoder 202, bundles the four symbols into two pairs to vectors ([$r_1$, $r_2$], [$r_3$, $r_4$]), wherein each pair includes two symbols or elements.

Further, the encoder 204 encodes each vector by an Alamouti scheme and performs a frequency-space mapping for the encoded vectors. An encoding matrix based on the operation of the encoder 204 may be defined as shown in Equation (1).

Referring to Equation (1), in the encoding matrix, as described above, the number of columns corresponds to the number of transmit antennas and the number of rows corresponds to the number of used sub-carriers. That is, the encoder 204 generates the four antenna signals (or vectors) [$r_1$, $r_2$, 0, 0], [$-r_2^*$, $r_1^*$, 0, 0], [0, 0, $r_3$, $r_4$] and [0, 0, $-r_4^*$, $r_3^*$], and outputs the generated signals to the corresponding OFDM modulators 206, 208, 210 and 212, respectively. For example, the [$r_1$, $r_2$, 0, 0] is output to the first OFDM modulator 206, the [$-r_2^*$, $r_1^*$, 0, 0] is output to the second OFDM modulator 208, the [0, 0, $r_3$, $r_4$] is output to the third OFDM modulator 210, and the [0, 0, $-r_4^*$, $r_3^*$] is output to the fourth OFDM modulator 212.

The first OFDM modulator 206 allocates the symbols [$r_1$, $r_2$, 0, 0] from the encoder 204 to four adjacent sub-carriers, and performs an IFFT to output IFFTed signals. The IFFTed signals are input to the gradient algorithm unit 214 in order to minimize the PAPR. The IFFTed signals are then converted into RF signals and transmitted through the first transmit antenna 222.

Likewise, the second to the fourth OFDM modulators 208, 210, and 212 allocate the symbols [$-r_2^*$, $r_1^*$, 0, 0], [0, 0, $r_3$, $r_4$] and [0, 0, $-r_4^*$, $r_3^*$] from the encoder 204 to four adjacent sub-carriers in order to perform an IFFT, respectively. The IFFTed signals are input to the gradient algorithm units 216, 218 and 220 in order to minimize the PAPR, respectively. The IFFTed signals are then converted into RF signals and transmitted through the second to the fourth transmit antennas 224, 226, and 228.

The symbols transmitted through the first to the fourth transmit antennas 222, 224, 226, and 228 are shown on a time-frequency plane as illustrated in (a), (b), (c), and (d) of FIG. 2.

Referring to FIG. 2, the symbols transmitted through the transmitter according to the present invention may be classified into sub-carriers transmitting data and sub-carriers not transmitting the data on the time-frequency plane, and it is easy to apply the TR scheme by means of the sub-carriers not transmitting the data. For example, when the number of transmit antennas is four in FIG. 2, the positions of the sub-carriers transmitting the data and the sub-carriers not transmitting the data are as follows.

In the antennas 1 and 2 in FIG. 2, the first and the second sub-carriers transmit the data and the third and the fourth sub-carriers do not transmit the data. That is, four sub-carriers are repeated in such a manner that the former two sub-carriers transmit the data and the latter two sub-carriers do not transmit the data. However, in the antennas 3 and 4 in FIG. 2, the first and the second sub-carriers do not transmit the data and the third and the fourth sub-carriers transmit the data. That is, four sub-carriers are repeated in such a manner that the former two sub-carriers do not transmit the data and the latter two sub-carriers transmit the data.

Hereinafter, the application of the TR scheme and the gradient algorithm as described above will be described in detail with reference to the accompanying drawings.

2. TR Scheme

Figure 3:
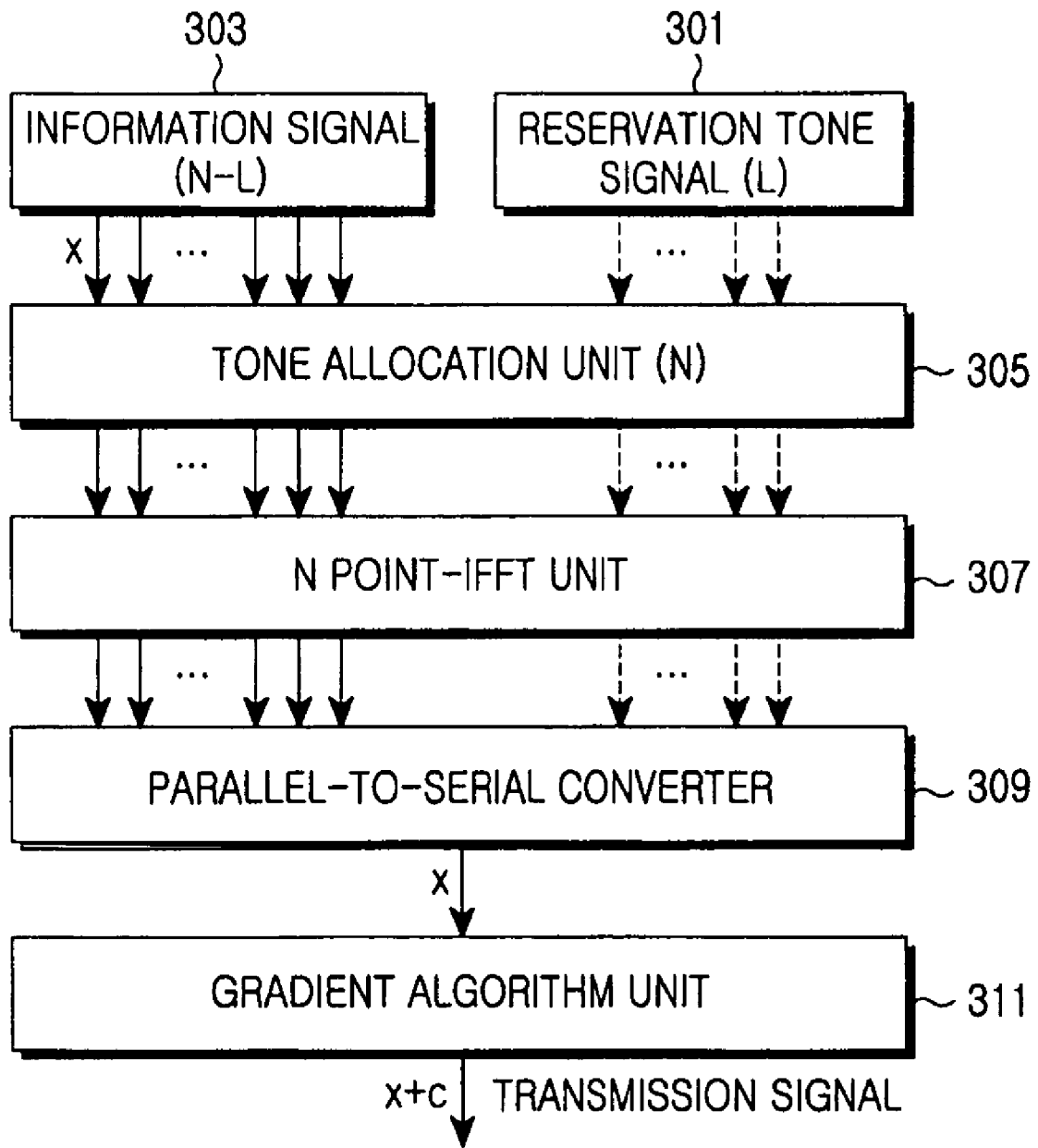
FIG. 3 is a block diagram illustrating a transmitter construction for describing the application of a TR scheme according to an embodiment of the present invention.

FIG. 3 is a block diagram illustrating an application of the TR scheme according to an embodiment of the present invention. However, before describing the TR scheme, terms used in the present specification will be described.

The following user data bits and control data bits will be referred to as 'information signals'. Further, the total number N of sub-carriers are comprised of L number of reservation tone signals 301 and (N-L) number of information signals 303 obtained by subtracting the L number of tone signals 301. The L number of reservation tone signals 301 not transmitting the information signal are used for generating a waveform having impulse characteristics and clipping output signals of an IFFT unit.

Referring to FIG. 3, the (N-L) number of information signals 303 and the L number of reservation tone signals 301 are input to a tone allocation unit 305. The L number of reservation tone signals 301 are allocated to the position of a sub-carrier, which has been previously determined between the transmitter and a receiver, through the tone allocation unit 305. That is, when the information signals 303 and the reservation tone signals 301 are allocated to the tone allocation unit 305, the (N-L) number of tones, which are the information signals 303, are allocated while leaving positions, to which the L number of signals having no information are to be input, empty. When the L number of reservation tones and the parallel data X, which are the (N-L) number of information signals, are allocated to the tone allocation unit 305, this may be expressed as shown in Equations (2) and (3) below.

$$C_k = \begin{cases} C_k, k \in \{i_1, i_2, \ldots, i_L\} \\ 0, k \notin \{i_1, i_2, \ldots, i_L\} \end{cases} \quad (2)$$

In Equation (2), the signals C added to the L number of tones in order to reduce the PAPR are determined as follows. A big letter described above and will be described below represents signals on a frequency domain.

The L number of sub-carriers are reserved in advance and used for the signals C, and the positions $\{i_1, i_2, \ldots, i_L\}$ of the L number of sub-carriers are fixed in the tone allocation unit 305 in an initial transmission and does not change during data transmission.

In equation 2, the K represents an index of the reservation tone signals in the tone allocation unit 305. The input signals X are allocated to sub-carriers other than the signals C, as shown in Equation (3) below.

$$X_k = \begin{cases} X_k, & k \notin \{i_1, i_2, \ldots, i_L\} \\ 0, & k \in \{i_1, i_2, \ldots, i_L\} \end{cases} \quad (3)$$

Using Equations (2) and (3), signals (X+C) obtained by adding the input signals X to the signals C are input to the high power amplifier of the transmitter. When the PAPR of the input signals X is large, the proper signals C allowing the PAPR of the input signals X to reduce are searched and the signals C are added to the input signals X. Therefore, the PAPR of the signals (X+C) reduces.

In the signals (X+C), the signals C are modified in order to find out optimized signals $\tilde{C}$ for minimizing the PAPR. The $\tilde{C}$ may be defined as shown in Equation (4) below.

$$\tilde{C} = Arg \stackrel{min}{\tilde{c}} (n = 0^{max}, \ldots, N-1^{|x_n + c_n|}) \quad (4)$$

In Equation (4), the (x+c) represents an IFFT(X+C) which denotes signals on a time domain converted from signals (X+C) on a frequency domain, the n represents an index of an IFFT having a length N, and the $(x_n + c_n)$ represents an $n^{th}$ sample value on the time domain. $\tilde{C}$ represents signals on the time domain obtained by performing an IFFT for the signals C on the frequency domain.

In order to determine optimized signals of the $\tilde{C}$, the operation shown in Equation (4) is performed. Accordingly, in order to solve Equation (4), a complicated linear operation must be performed. However, in an actual realization, a gradient algorithm is applied, which can acquire similar performance with only a simple operation.

The parallel data X, which is the (N-L) number of information signals, and the reservation tone signals C, which have been allocated to the L number of reservation tone signals, are transmitted from the tone allocation unit 305 to an N point-IFFT unit 307. The N point-IFFT unit 307 receives all allocated tone signals, performs an IFFT operation for the received tone signals, and outputs parallel signals to a parallel-to-serial converter 309. The parallel-to-serial converter 309 receives the parallel signals after the IFFT operation, converts the parallel signals to serially converted signals, and outputs the serially converted signals to a gradient algorithm unit 311.

When it is assumed that the serially converted signals are x, the signals x are signals on a time domain. The gradient algorithm unit 311 outputs transmission signals (x+c), which are obtained by adding output signals c on the time domain to the output signals x of the IFFT unit 307, to the receiver.

Hereinafter, the gradient algorithm unit will be described in more detail.

3. The Gradient Algorithm Unit 3-1. Construction

Figure 4:
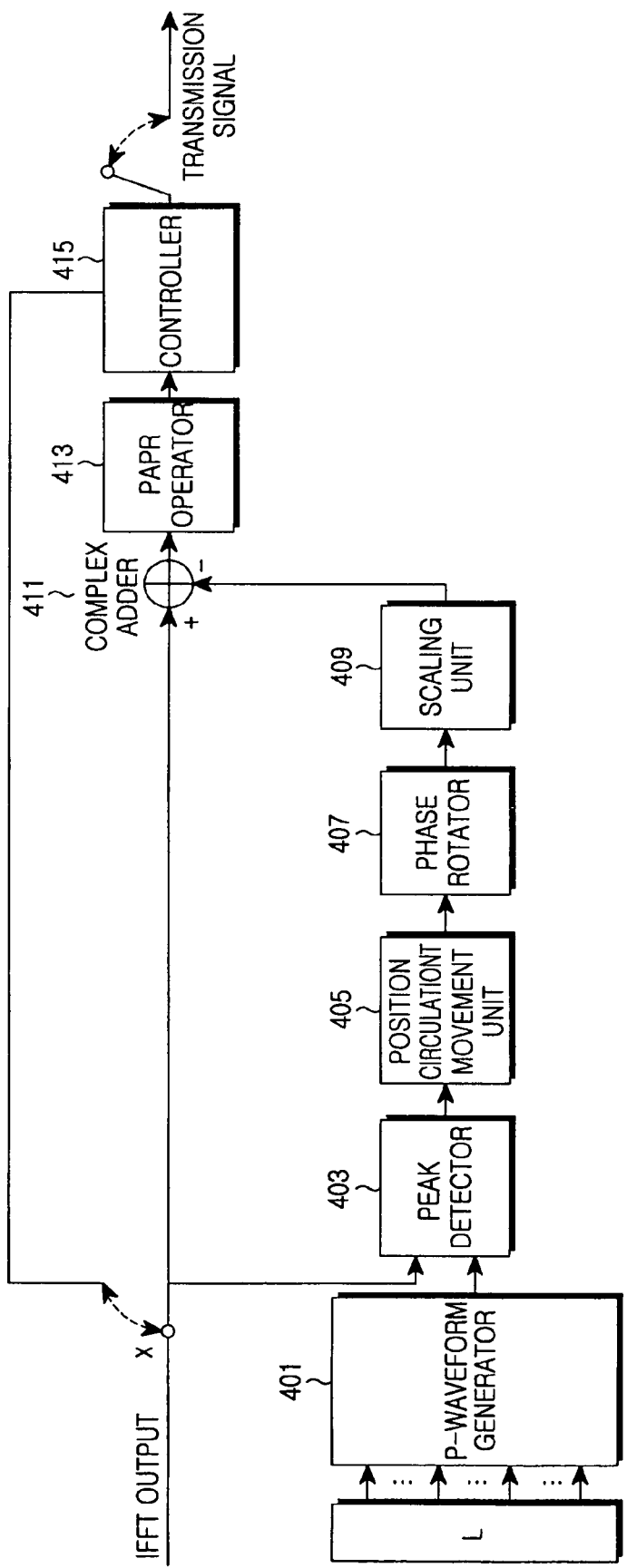
FIG. 4 is a detailed block diagram illustrating a gradient algorithm unit in a transmitter according to an embodiment of the present invention.

FIG. 4 is a detailed block diagram illustrating a gradient algorithm unit according to an embodiment of the present invention. Referring to FIG. 4, the gradient algorithm unit 311 as illustrated in FIG. 3 includes a P-waveform generator 401, a peak detector 403, a position circulation movement unit 405, a phase rotator 407, a scaling unit 409, a complex adder 411, a PAPR operator 413, and a controller 415.

The P-waveform generator 401 receives the L number of tones 301 having positions reserved in the tone allocation unit 305, except for the (N-L) number of information signals from among the total N number of tone signals, and generates a P-waveform having impulse characteristics. The P-waveform is similar to impulse signals selected by repeating, a predetermined number of times, a process for randomly selecting L reserved tones from the total signals.

In the selection process, a value having the smallest power value is selected from remaining values $p_1, \ldots, p_{N-1}$ except for a peak value $p_0$ from among values generated through the repetition.

The serially converted signals x on the time domain after the IFFT in FIG. 3 become an input value of the gradient algorithm unit 311. The peak detector 403 detects a maximum peak value of the signals x input to the gradient algorithm unit 311. The position circulation movement unit 405 circularly moves the position of the P-waveform to the position of the detected maximum peak value.

After the position circulation movement, the value of $p_0$ moves to the position of the maximum peak value. The phase rotator 407 harmonizes the circularly moved P-waveform with the phase of the maximum peak value detected on a complex plane. The scaling unit 409 scales the value of the P-waveform so that the peak value of the output signals x after the IFFT is smaller than a system setup PAPR. When a scaling value for lowering the maximum peak value below the setup PAPR is c, the value c computed by the gradient algorithm unit 311 is a computed value optimized in order to remove the peak value of the output signals x after the IFFT unit 307.

The complex adder 411 adds the IFFT output signals x to the value c computed in order to lower the maximum peak value of the P-waveform below a predetermined level, and outputs signals (x+c) to the PAPR operator 413. The PAPR operator 413 computes a PAPR for the input signals (x+c) and outputs the computed PAPR value to the controller 415.

When the input PAPR value is larger than the system setup PAPR, the controller 415 feedbacks the input PAPR value. That is, the controller 415 feedbacks the input PAPR value again so that the input PAPR value is smaller than the system setup PAPR, and repeats a gradient algorithm. The repetition as described above is performed until the input PAPR value is smaller than the system setup PAPR.

Preferably, in order to prevent an infinite repetition, the system is constructed that a maximum number of repetitions is set and signals are transmitted when the repetition is performed by the number of repetitions even though the input PAPR value is not smaller than the system setup PAPR.

As descried above, the SFBC MIMO-OFDM system includes the sub-carriers transmitting data and the sub-carriers not transmitting the data. Accordingly, the present invention can reduce the PAPR using the sub-carriers not transmitting the data as reservation sub-carriers of the TR scheme.

Further, the TR scheme has an advantage in that there is no change in the construction of the receiver in comparison with other PAPR reduction schemes. Furthermore, when a sub-carrier mapping is randomly performed in the SFBC scheme, the PAPR reduction performance is superior. The detailed contents relating to these advantages will be described in related sections in more detail.

3-2. Operation

Figure 5:
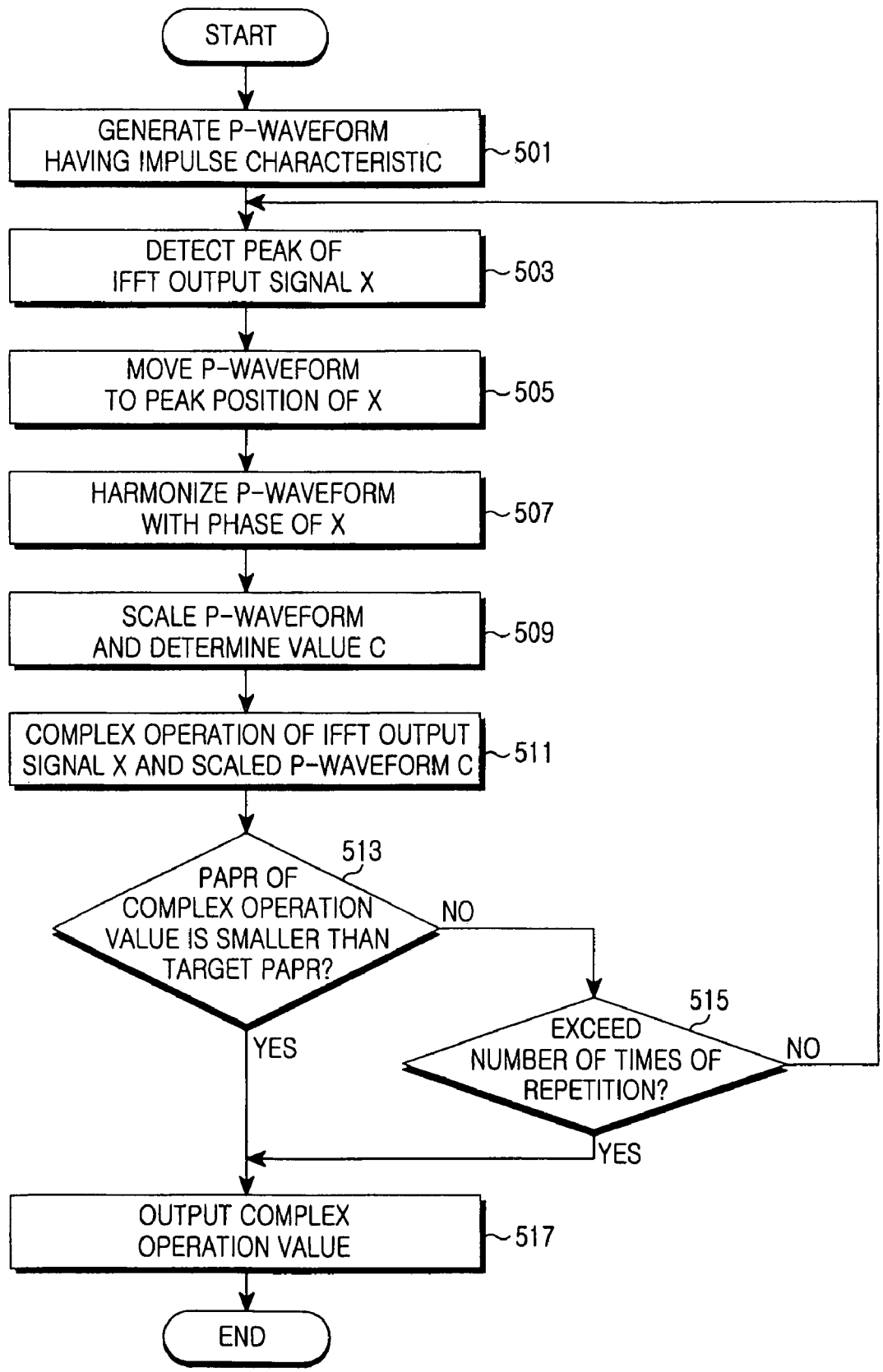
FIG. 5 is a flow diagram illustrating an operation of a gradient algorithm unit according to an embodiment of the present invention.

FIG. 5 is a flow diagram illustrating an operation of the gradient algorithm unit according to an embodiment of the present invention. Referring to FIG. 5, the P-waveform generator generates the P-waveform having the impulse characteristics from the L number of tones having reserved positions from among the total N number of multi-carriers in step 501.

The L number of reserved tones are selected from the subcarriers not transmitting the data by a predetermined number, e.g., L tones. When the P-waveform is generated, the peak detector detects the peak of the output signals x on the time domain having passed the IFFT unit in step 503. Herein, detecting the peak of the output signals x is to detect the position of the peak value having deviated from the PAPR of the system setup value.

In step 505, the position circulation movement unit circularly moves the generated P-waveform to the position of the detected peak value (the peak of the output signals x). For example, the phase circularly moved on the complex plane in step 505 can be obtained by normalizing a maximum peak value $x_k$. Further, the phase of the P-waveform $p_0$ having impulse characteristics is rotated by the phase of the peak value $x_k$, so that the two phases coincides with each other. The $p_0$ identically has a value in which power is 1. The phase rotation of the $p_0$ can be obtained through a complex number multiplication of the $p_0$ by $$\frac{x_k}{|x_k|}.$$

Through the method as described above, the P-waveform coincides with the phase of the x in step 507. That is, the $p_0$ is identical to the phase of the peak value $x_k$.

In step 509, the scaling unit scales the P-waveform so that the peak value $x_k$ is smaller than the system setup PAPR, and determines the scaled value c. The complex operation (x+c) of the IFFT output signals x and the scaled P-waveform c in step 511.

In step 513, it is determined if the computed value of (x+c) in step 511 is smaller than the system setup PAPR as is shown in Equation (7).

Hereinafter, a process for acquiring the value c scaled in order to reduce the peak value as described above is as follows.

(1) an initial value $c^{(0)} = [00 \ldots 0]^T = o_N$.

(2) a maximum peak value and a position of $|x_k + c_k^{(i-1)}|$ are searched.

If the maximum peak value is smaller than the system setup PAPR, the controller transmits $(x+c^{(0)})$. However, the maximum peak value is not smaller than the system setup PAPR, the following (3) is performed.

(3) the value c is computed as shown in Equation (5) below.

$$c^{(i)} = c^{(i-1)} - \alpha_i P[((n-m_i))N] \quad (5)$$

In Equation (5), $m_i$ represents the position of the peak value and $\alpha_i$ represents phase rotation and scaling value. The $m_i$ and the $\alpha_i$ may be defined as shown in Equation (6) below.

$$m_i = Arg\max|x_n + c_n^{(i)}| \quad (6)$$

$$\alpha_i = \frac{x_{m_i} + c_{m_i}^{(i)}}{|x_{m_i} + c_{m_i}^{(i)}|}(|x_{m_i} + c_{m_i}^{(i)}| - A)$$

After the scaling value c is computed as described above, the processes after (2) are repeated. The repetition process is set so that it is performed by a preset number of repetitions, e.g., by j repetitions.

(4) the PAPR output signals operated after the repetition process is performed by the j repetitions as shown in Equation (7) below.

$$x + c^{(j)} = x - \sum_{i=1}^{j} \alpha_i p[((n-m_i))_N] \quad (7)$$

After the complex operation in step 511, the controller compares a PAPR of the complex operation value of the (x+c) with a target PAPR in step 513. For example, when the complex operation value of the (x+c) in Equation (7) is smaller than the system setup PAPR, the controller outputs the complex operation value in step 517 and ends the repetition process. However, when the complex operation value (x+c) is not smaller than the system setup PAPR, the controller determines if the repetition process has exceeded the preset number of repetitions in step 515.

When the repetition process has not exceeded the preset number of repetitions, i.e., the j repetitions, step 503 is performed. However, if the repetition process is performed by the preset number of repetitions, i.e., exceeds the predetermined number of times, step 517 is performed. Thereafter, the repetition process ends.

Even when the repetition process for reducing the setup PAPR has exceeded the number of repetitions having been preset in the system, the controller outputs the complex operation value.

As described above, the present invention applies the gradient algorithm of the TR to the output signals of each OFDM modulator in order to minimize the PAPR of the output signals, thereby enabling the output signals to be transmitted through a plurality of antennas.

4. Transmitter Operation

Figure 6:
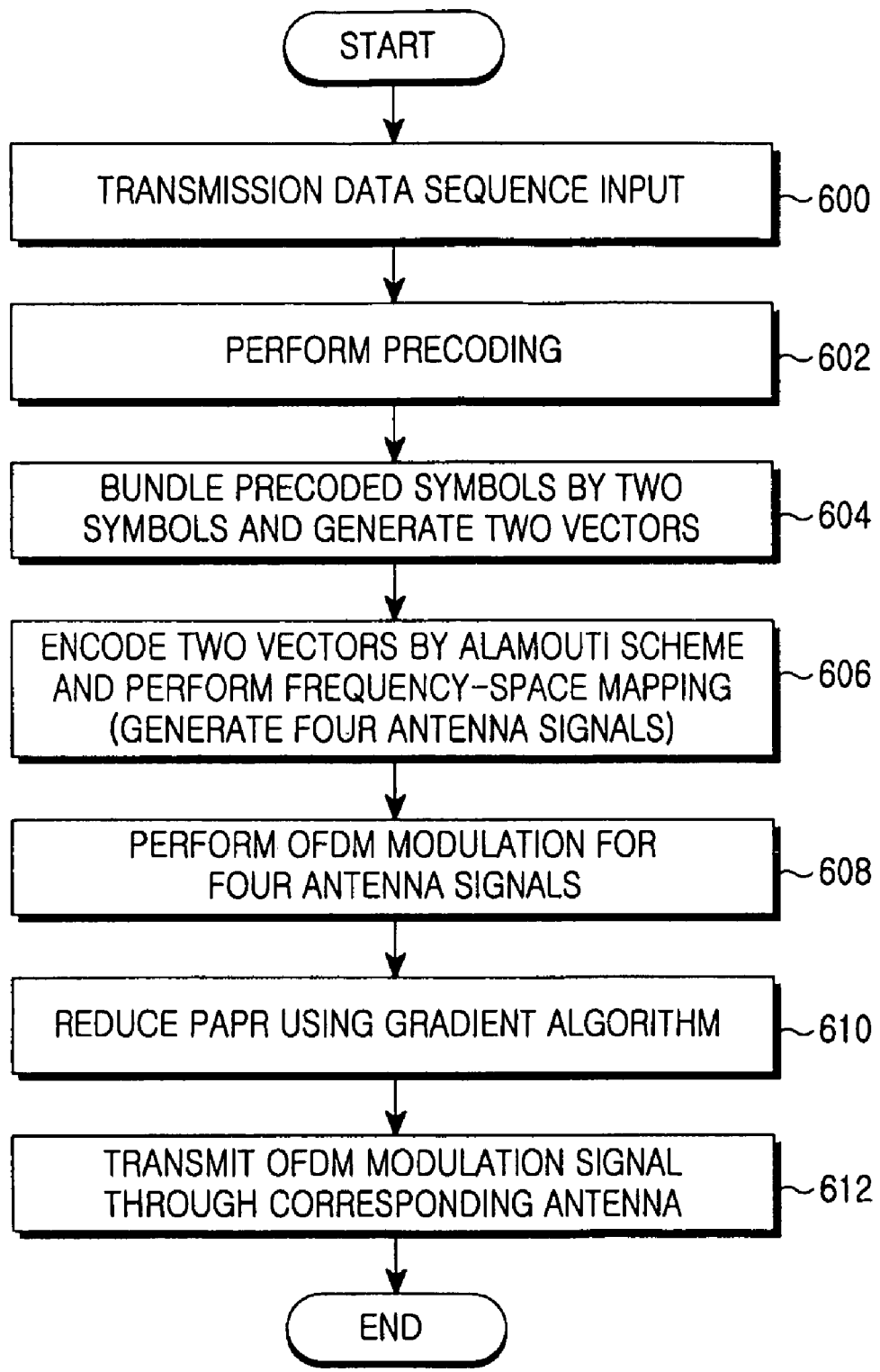
FIG. 6 is a flow diagram illustrating a transmission process of a transmitter in an OFDM communication system using an SFBC scheme according to an embodiment of the present invention.

FIG. 6 is a flow diagram illustrating a transmission process of the transmitter in the OFDM communication system using the SFBC scheme according to an embodiment of the present invention. More specifically, FIG. 6 illustrates the transmission process of the transmitter employing the PAPR reduction method using the TR in the OFDM communication system using the SFBC scheme in which the number of transmit antennas is four by way of example. That is, as described above, in the transmitter of the present invention, the number of antennas is not limited to this example.

Referring to FIG. 6, in step 600, the transmitter receives a transmission data sequence x, i.e., $[x_1, x_2, x_3, x_4]$. In step 602, the precoder of the transmitter performs precoding for the received data sequence by means of a preset precoding matrix θ, and generates a precoded symbol sequence r, i.e., $[r_1, r_2, r_3, r_4]$ through the precoding. In step 604, the encoder of the transmitter bundles the symbols constituting the precoded symbol sequence r into two pairs of vectors ($[r_1, r_2]$, $[r_3, r_4]$).

In step 606, the encoder encodes each vector by the Alamouti scheme and performs the frequency-space mapping for the encoded vectors. Herein, because it is assumed that the number of transmit antennas is four, four antenna signals are generated in the above process. The four antenna signals correspond to $[r_1, r_2, 0, 0]$, $[-r_2^*, r_1^*, 0, 0]$, $[0, 0, r_3, r_4]$ and $[0, 0, -r_1^*, r_3^*]$ as understood through equation 1. The four symbols constituting one antenna signal are allocated to four adjacent sub-carriers.

After generating the four antenna signals in step 606, the transmitter allocates each of the four antenna signals to the sub-carriers and performs an IFFT to output IFFTed signals in step 608. In step 610, the transmitter reduces the PAPR of the IFFTed signals in the gradient algorithm unit. In step 612, the transmitter transmits the signals having the reduced PAPR through corresponding antennas. That is, the transmitter transmits the OFDM modulation signals through the four antennas, e.g., the first antenna 222, the second antenna 224, the third antenna 226, and the fourth antenna 228.

Hereinafter, the receiver corresponding to the transmitter will be described. Before a description of the receiver is given, however, it is noted that the transmitter employs the TR scheme in order to reduce the PAPR. Additionally, while the TR scheme reduces the PAPR in the transmitter, the receiver does not need any processing. Accordingly, the receiver can receive data without changing the construction of an existing receiver.

5. Receiver Structure

Figure 7:
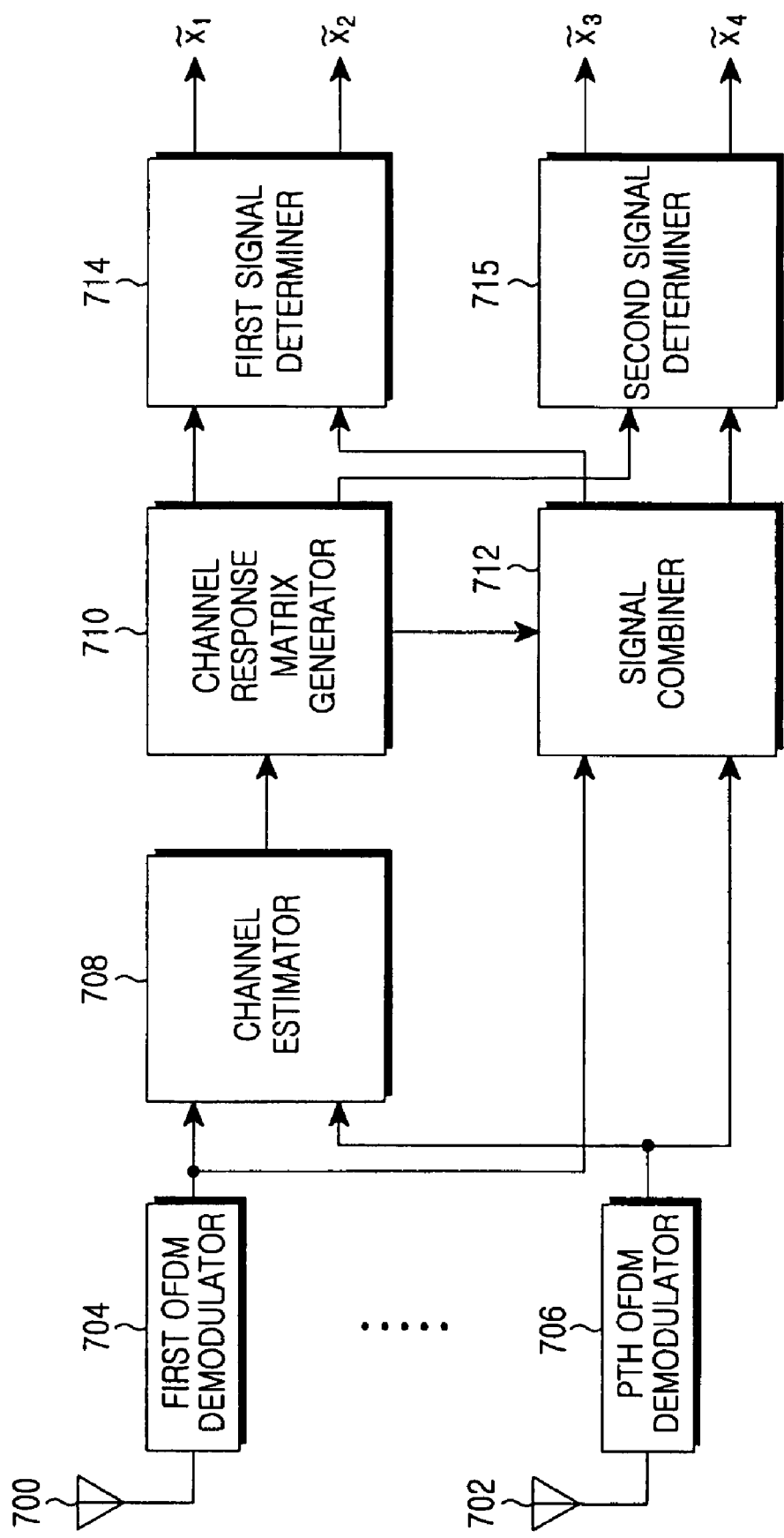
FIG. 7 is a block diagram illustrating a receiver in an OFDM communication system using an SFBC scheme according to an embodiment of the present invention.

FIG. 7 is a block diagram illustrating a receiver in the OFDM communication system using the SFBC scheme according to an embodiment of the present invention. It should be noted that the following description is based on an assumption that the receiver operates in response to signals transmitted from four transmit antennas in the transmitter.

Referring to FIG. 7, the receiver according to an embodiment of the present invention includes a plurality of receive antennas, e.g., a first receive antenna 700 to a $P^{th}$ receive antenna 702, a plurality of OFDM modulators, e.g., a first OFDM demodulator 704 to a $P^{th}$ OFDM demodulator 706, a channel estimator 708, a channel response matrix generator 710, a signal combiner 712, and one or more signal determiners, e.g., a first signal determiner 714 and a second signal determiner 715. It is assumed that the number of receive antennas is different from that of transmit antennas in the transmitter, but the scope of the present invention is not limited to this example. That is, the number of transmit antennas in the transmitter may also be identical to that of receive antennas.

Referring to FIG. 7, the signals transmitted through the transmit antennas of the transmitter, e.g., the first antenna 222, the second antenna 224, the third antenna 226, and the fourth antenna 228, are received through the receive antennas, e.g., the first receive antenna 700 to the $P^{th}$ receive antenna 702. The first receive antenna 700 to the $P^{th}$ receive antenna 702 output the received signals to corresponding OFDM modulators, e.g., the first OFDM demodulator 704 to the $P^{th}$ OFDM demodulator 706, respectively.

Each of the first OFDM demodulator 704 to the $P^{th}$ OFDM demodulator 706 converts the signals received from the corresponding receive antennas 700 to 702 into baseband signals, performs a Fast Fourier Transform (FFT) for the baseband signals, performs an OFDM demodulation for the FFTed signals, and outputs OFDM demodulated data. Herein, each of the OFDM demodulators 704 to 706 outputs the OFDM demodulated data to both the channel estimator 708 and the signal combiner 712.

The channel estimator 708 receives the OFDM demodulated data from the OFDM demodulators 704 to 706 and estimates channel coefficients representing a channel gain. The estimated channel coefficients are provided to the channel response matrix generator 710.

If it is assumed that the number of receive antennas in the receiver is one, signals received through the one receive antenna may be defined as expressed in Equation (8) below.

$$y = H\Theta d + n \qquad (8)$$

$$= \frac{1}{2}\begin{bmatrix} h_1 & h_1\alpha_0^1 & h_2 & h_2\alpha_0^1 \\ h_2^* & h_2^*\alpha_0^1 & -h_1^* & -h_1^*\alpha_0^1 \\ h_3 & h_3\alpha_1^1 & h_4 & h_4\alpha_1^1 \\ h_4^* & h_4^*\alpha_1^1 & -h_3^* & -h_3^*\alpha_1^1 \end{bmatrix}\begin{bmatrix} x_1 \\ x_2 \\ x_3 \\ x_4 \end{bmatrix} + \begin{bmatrix} n_1 \\ n_2^* \\ n_3 \\ n_4^* \end{bmatrix}$$

In Equation (8), y represents a vector received thorough the receive antenna, H represents a first channel response matrix, n represents a noise vector, and $\Theta$ represents a precoding matrix.

The channel estimator 708 receives the signals y as shown in Equation (8), performs a channel estimation for the input signals, and outputs a result of the channel estimation, i.e., the channel coefficients, to the channel response matrix generator 710. The channel response matrix generator 710 generates a second channel response matrix $H_{new}$ as expressed by Equation (9) by means of the channel coefficients from the channel estimator 708.

$$H_{new} = \begin{bmatrix} h_1 & h_1\alpha_0^1 & h_2 & h_2\alpha_0^1 \\ h_2^* & h_2^*\alpha_0^1 & -h_1^* & -h_1^*\alpha_0^1 \\ h_3 & h_3\alpha_1^1 & h_4 & h_4\alpha_1^1 \\ h_4^* & h_4^*\alpha_1^1 & -h_3^* & -h_3^*\alpha_1^1 \end{bmatrix} \qquad (9)$$

The second channel response matrix $H_{new}$ generated newly as expressed by Equation (9) can be acquired by a multiplication of the first channel response matrix H by the precoding matrix $\Theta$ recognized in advance as it can be understood in Equation (8).

The second channel response matrix $H_{new}$ generated by the channel response matrix generator 710 are provided to the signal combiner 712, the first signal determiner 714, and the second signal determiner 715. The signal combiner 712 combines the OFDM demodulated data from the OFDM demodulators 704 to 706 with the second channel response matrix $H_{new}$ from the channel response matrix generator 710 according to a predetermined rule, thereby outputting a vector with a size $N_t$. More specifically, the signal combiner 712 calculates a Hermitian matrix $H_{new}^H$ of the second channel response matrix $H_{new}$, and outputs the signals y from the OFDM demodulators 704 to 706.

When it is assumed that the number of symbols constituting the vector y is $N_t$, the signal combiner 712 outputs a first to a $$\left(\frac{N_t}{2}\right)^{th}$$

symbol from among the symbols to the first signal determiner 714 and outputs a $$\left(\frac{N_t}{2}+1\right)^{th}$$

to an $N_t^{th}$ symbol to the second signal determiner 715.

The first signal determiner 714 performs maximum likelihood decoding by means of the second channel response matrix $H_{new}$ from the channel response matrix generator 710 and the vector from the signal combiner 712, thereby estimating and outputting the symbols transmitted from the transmitter. The second signal determiner 715 performs the maximum likelihood decoding by means of the second channel response matrix $H_{new}$ from the channel response matrix generator 710 and the vector from the signal combiner 712, thereby estimating and outputting the symbols transmitted from the transmitter.

6. Receiver Operation

Figure 8:
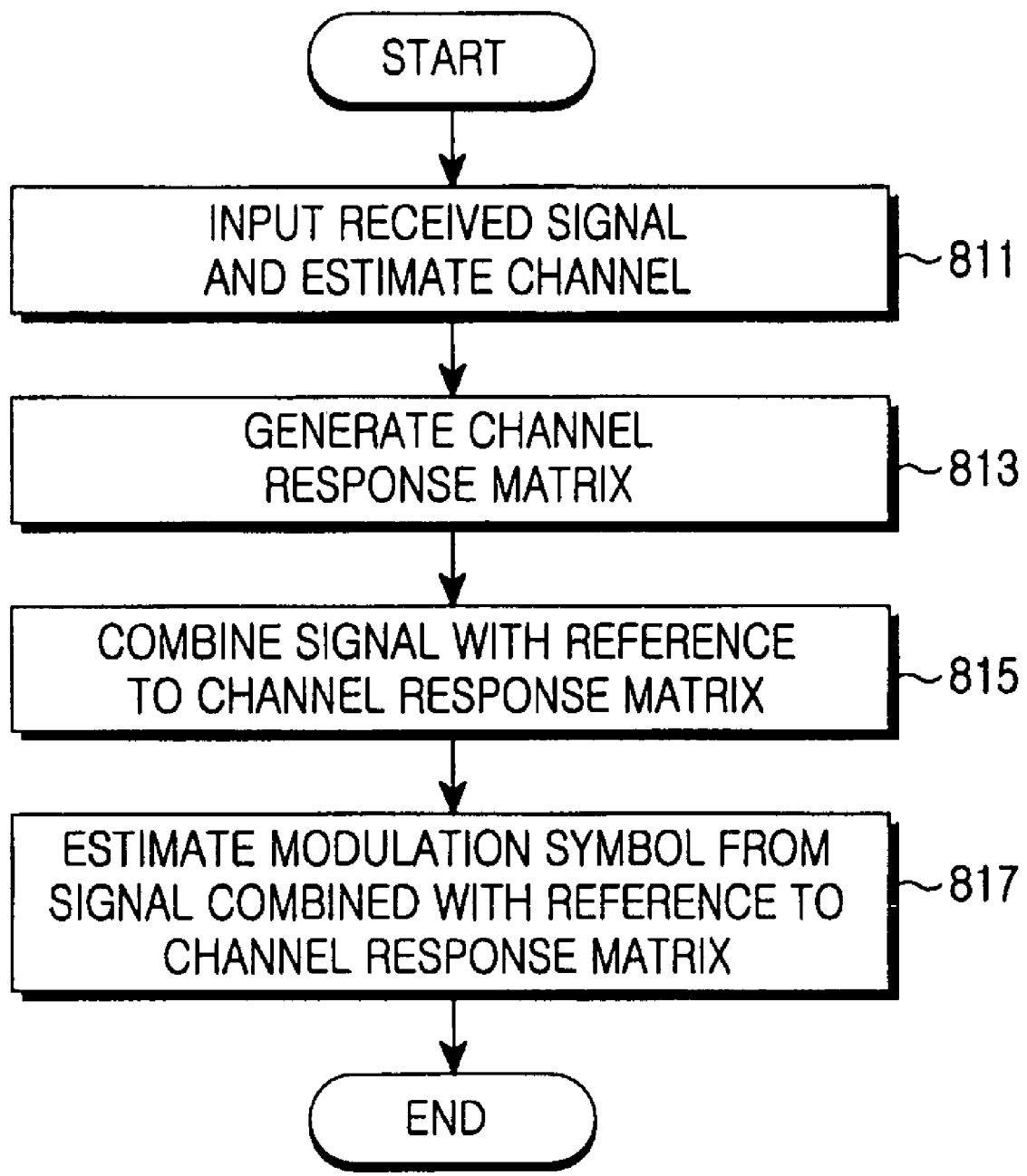
FIG. 8 is a flow diagram illustrating a reception process of a receiver in an OFDM communication system using an SFBC scheme according to an embodiment of the present invention.

FIG. 8 is a flow diagram illustrating a reception process of the receiver in the OFDM communication system using the SFBC scheme according to an embodiment of the present invention. Referring to FIG. 8, in step 811, the receiver performs an OFDM demodulation for the signals received through the receive antennas, and estimates the channel coefficients representing the channel gain between the transmitter and the receiver by means of the OFDM demodulated signals. In step 813, the receiver generates the second channel response matrix $H_{new}$ by means of the estimated channel coefficients. In step 815, the receiver combines the OFDM demodulated signals with the second channel response matrix $H_{new}$ according to a predetermined rule, thereby generating the vector including $N_t$ number of symbols. In step 817, the receiver divides the generated vector into two vectors, and performs the maximum likelihood decoding by means of the two vectors and the second channel response matrix $H_{new}$, thereby determining the symbols transmitted from the transmitter.

As described above, the present invention uses the TR scheme in order to solve the PAPR problem occurring in the MIMO-OFDM communication system. More specifically, the present invention properly utilizes the TR scheme for reducing the PAPR by means of the SFBC scheme and certain allocation tones, such that it is possible to apply the PAPR reduction scheme without significant change in the construction of the MIMO-OFDM communication system.

Hereinafter, the structure of a transmitter capable of acquiring superior PAPR reduction performance by randomly mapping sub-carriers in an SFBC according to another embodiment of the present invention will be described.

1. Transmitter Structure

Figure 9:
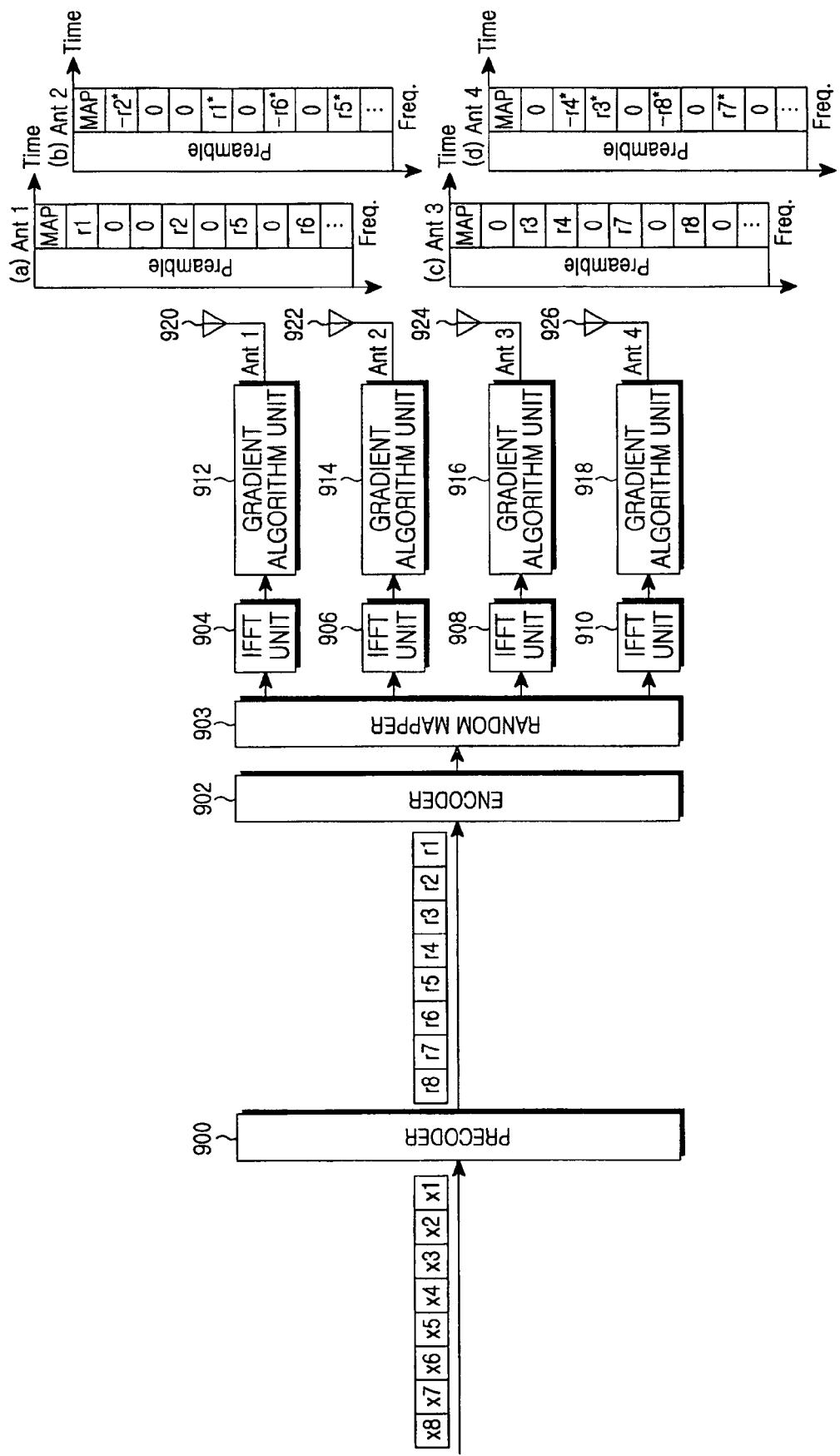
FIG. 9 is a block diagram schematically illustrating a transmitter in an OFDM communication system using an SFBC scheme according to an embodiment of the present invention.

FIG. 9 is a block diagram schematically illustrating the construction of the transmitter using the SFBC scheme according to an embodiment of the present invention. More specifically, FIG. 9 is a block diagram illustrating the construction of the transmitter in an OFDM communication system for randomly mapping and using sub-carriers in the SFBC scheme.

Referring to FIG. 9, the transmitter includes a precoder 900, an encoder 902, a random mapper 903, a plurality of OFDM modulators 904, 906, 908, and 910, a plurality of gradient algorithm units 912, 914, 916, and 918 for PAPR reduction, and a plurality of transmit antennas 920, 922, 924, and 926.

This transmitter according to the present invention has the same structure as that of the transmitter of FIG. 2, except for the random mapper 903 for application of a random mapping method. Accordingly, elements of the transmitter in FIG. 9 overlapping with those of the transmitter in FIG. 2 will be briefly described or a description on the elements will be omitted, and the transmitter will be described with a focus on the random mapper 903.

The precoder 900 codes $N_t$ input symbols, e.g., four symbols $x_1$ to $x_4$, into a preceding matrix so that a signal rotation is generated on a signal space, and outputs a complex vector r including four symbols $r_1$ to $r_4$.

The encoder 902 receives the symbols from the precoder 900, separates the received symbols in order to generate a predetermined number of vectors, encodes each of the generated vectors by an Alamouti scheme, and outputs the encoded vectors to the random mapper 903.

The random mapper 903 randomly maps the encoded vectors on a frequency plane through the first to the fourth transmit antennas 902, 922, 924 and 926. Different than the transmitter of FIG. 2, the transmitted in FIG. 9 is characterized in that a random mapping other than a preset/fixed or any regular mapping is performed in a frequency space mapping. For this characteristic, the random mapper 903 is disposed after the encoder 902, so that the symbols are encoded and randomly mapped.

According to the random mapping method, a random selection is performed for every four adjacent sub-carriers. The random mapping is performed, so that it is possible to improve performance of an impulse generated using reserved tones when the afore-described TR scheme is applied. That is, it is possible to generate a waveform in which the second peak of an impulse is small.

In FIG. 9, the random mapper 903 is separately provided for the random mapping, but the scope of the present invention is not limited to this construction. Preferably, the encoder 902 may have a random mapping function as an additional function further to the encoding function. Accordingly, without a separate physical element, it is also possible to achieve the two functions only with the encoder 902.

Each of the OFDM modulators 904, 906, 908, and 910 allocates the symbols from the encoder 902 and the random mapper 903 to the four adjacent sub-carriers, performs an IFFT, and outputs IFFTed signals. Each of the gradient algorithm units 912, 914, 916, and 918 minimizes the PAPR of the IFFTed signals, converts the IFFTed signals to RF signals, and transmits the RF signals through the transmit antennas 920, 922, 924, and 926.

The symbols transmitted through the first to the fourth transmit antenna 920, 922, 924, and 926 are shown on a time-frequency plane as illustrated in (a), (b), (c) and (d) of FIG. 9.

According to the transmitter of the present invention as described above, the random mapping is performed, so that it is possible to improve the performance of the impulse generated using the reserved tones when the afore-described TR scheme is applied. That is, it is possible to generate a waveform in which the second peak of an impulse is small.

2. Transmitter Operation

Figure 10:
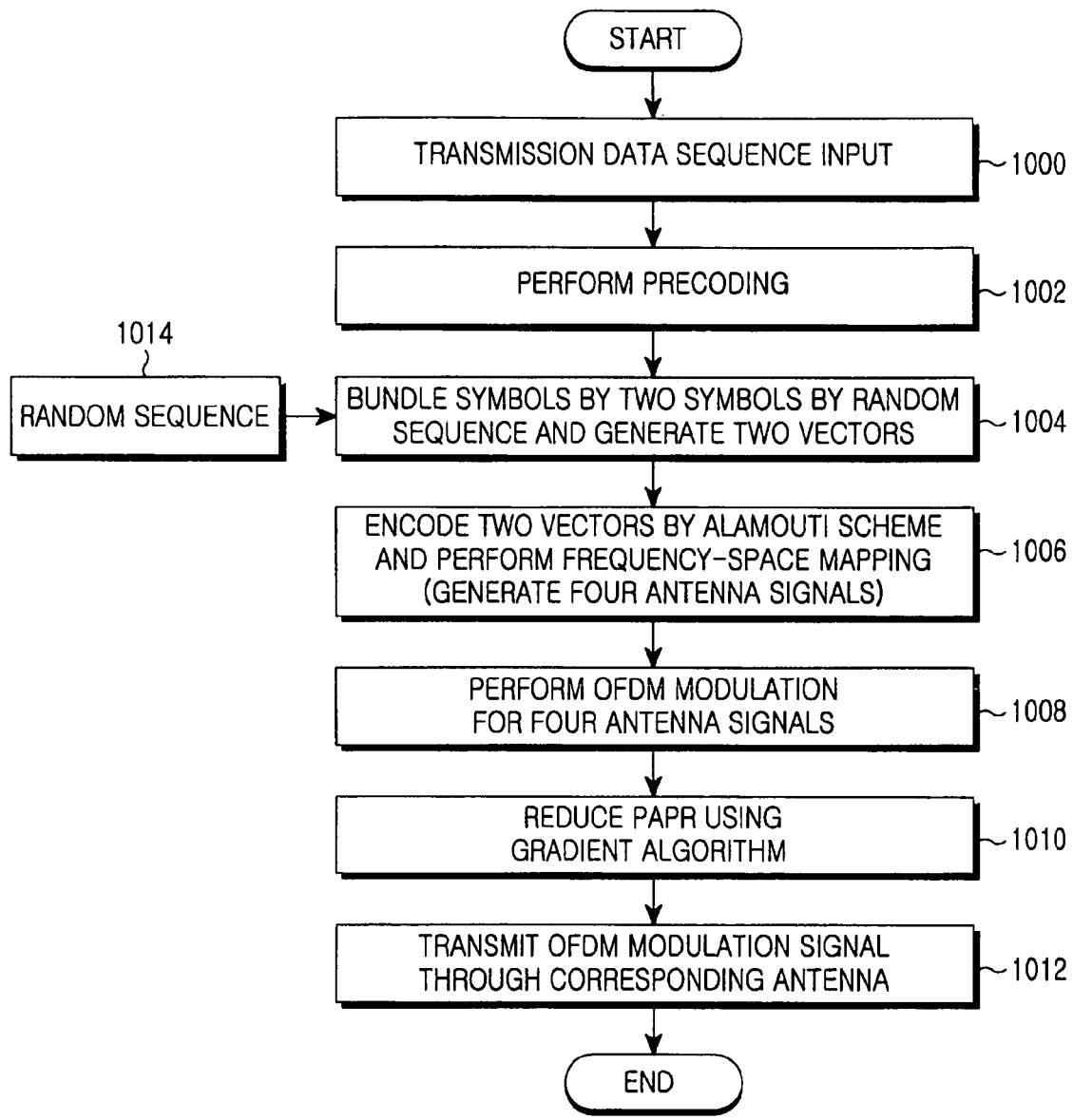
FIG. 10 is a flow diagram illustrating a transmission process of a transmitter in an OFDM communication system using an SFBC scheme according to an embodiment of the present invention.

FIG. 10 is a flow diagram illustrating a transmission process of the transmitter in the OFDM communication system using the SFBC scheme according to an embodiment of the present invention. However, before describing FIG. 10, the transmitter in FIG. 9 uses a plurality of transmit antennas as described in with transmitter in FIG. 2.

FIG. 10 illustrates the transmission process of the transmitter employing the PAPR reduction method using the TR in the OFDM communication system using the SFBC scheme. More specifically, in FIG. 10, a sub-carrier mapping method is randomly performed according to antennas, such that it is possible to acquire superior PAPR reduction performance when the TR is applied.

In the following description, again it is assumed that the number of transmit antennas is four. However, in the transmitter of the present invention, it is apparent to those skilled in the art that the number of antennas is not limited to four.

Referring to FIG. 10, in step 1000, the transmitter receives a transmission data sequence x, i.e., [$x_1$, $x_2$, $x_3$, $x_4$]. In step 1002, the precoder of the transmitter performs precoding for the received data sequence by means of a preset precoding matrix θ, and generates a precoded symbol sequence r, i.e., [$r_1$, $r_2$, $r_3$, $r_4$] through the precoding.

In step 1004, the encoder and the random mapper bundles the symbols constituting the precoded symbol sequence r into two pairs of vectors ([$r_1$, $r_2$], [$r_3$, $r_4$]). The method for bundling the symbols by two symbols is different from that of FIG. 6. That is, in step 1004, the transmitter sets a random sequence in advance and stores the random sequence in a memory therein. The random sequence has a length of 4. When the number of sub-carriers is N, the number of random sequences is N/4.

In an example to which the random sequence is applied, when the first random sequence is {1, 3, 4, 2}, the first sub-carrier and the third sub-carrier are bundled and the fourth sub-carrier and the second sub-carrier are bundled. The next four transmitted precoded symbol sequences are mapped to sub-carriers by the second random sequence.

Preferably, in the transmitter, a symbol sequence is initially generated in advance in a system and stored in a memory for use, instead of being generated every OFDM symbol each time. Accordingly, a receiver receives the random sequence from the transmitter, thereby confirming the position of the random sequence.

More specifically, the encoder and the random mapper generate the vectors through the random sequence. That is, the encoder and the random mapper performs the random selection for every four adjacent sub-carriers so that the symbols are randomly mapped on the frequency plane through the transmit antennas.

In step 1006, the encoder and the random mapper of the transmitter encode each of the generated vectors by the Alamouti scheme and perform the frequency-space mapping for the encoded vectors. Because it is assumed that the number of transmit antennas is four, four antenna signals are generated in the above process. The four symbols constituting one antenna signal are allocated to the four adjacent sub-carriers. If the random sequence is {1, 3, 4, 2}, the four antenna signals are mapped to [$r_1$, 0, $r_3$, 0], [$-r_3^*$, 0, $r_1^*$, 0], [0, $r_2$, 0, $r_4$], and [0, $-r_4^*$, 0, $r_2^*$].

After generating the four antenna signals in step 1006, the transmitter allocates each of the four antenna signals to the sub-carriers and performs an IFFT in step 1008. In step 1010, the transmitter reduces the PAPR of the IFFTed signals in the gradient algorithm unit. In step 1012, the transmitter transmits the signals having the reduced PAPR through corresponding antennas. That is, the transmitter transmits the OFDM modulation signals through the four antennas, e.g., the first antenna 920, the second antenna 922, the third antenna 924, and the fourth antenna 926.

Hereinafter, the receiver corresponding to the transmitter will be described.

3. Receiver Structure

Figure 11:
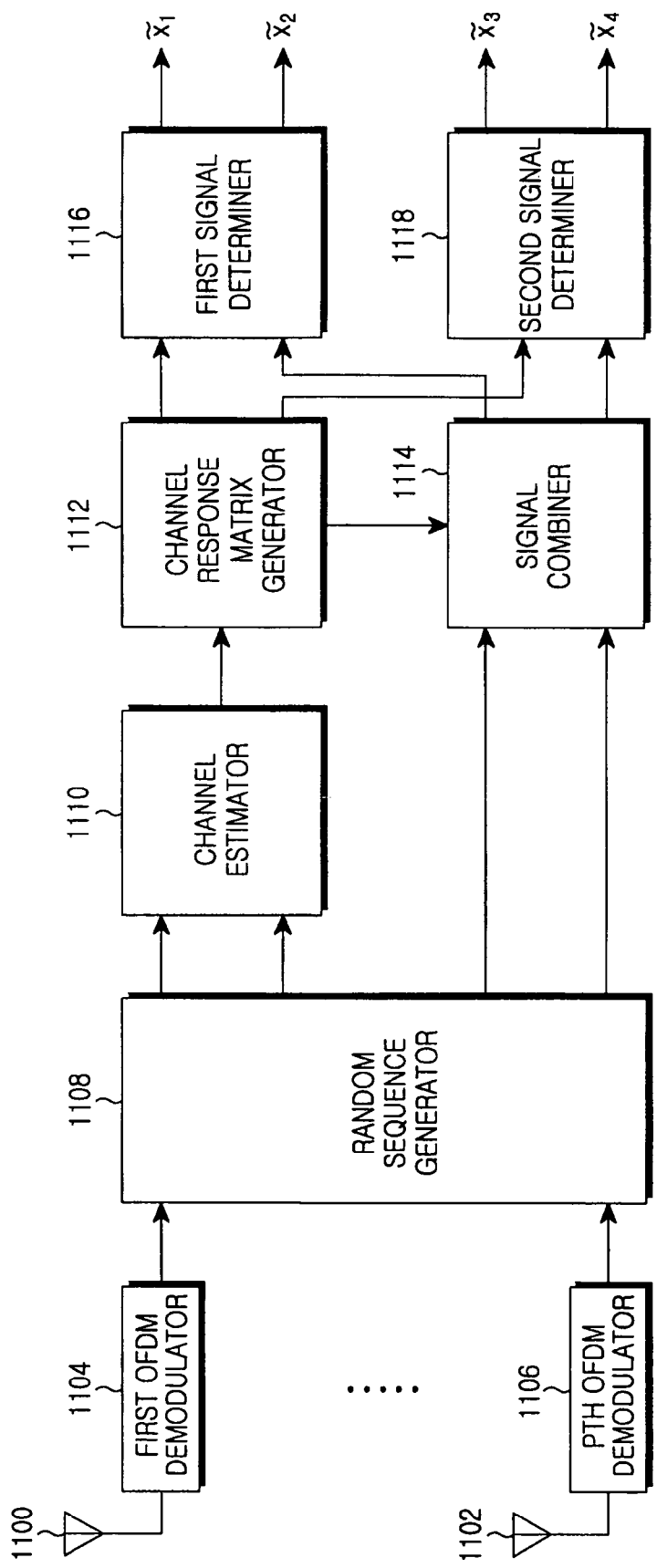
FIG. 11 is a block diagram illustrating a receiver in an OFDM communication system using an SFBC scheme according to an embodiment of the present invention.

FIG. 11 is a block diagram illustrating the construction of the receiver in the OFDM communication system using the SFBC scheme according to an embodiment of the present invention. It should be noted that the following description is based on an assumption that the receiver operates in response to signals transmitted four transmit antennas in the transmitter illustrated in FIG. 9.

The receiver has a structure similar to that of the receiver of FIG. 7. However, because the transmitter of FIG. 10 has performed the random sequence mapping, the receiver in FIG. 11 is characterized in that it must find out an index of a sub-carrier by means of the random sequence used in FIG. 10. Accordingly, the receiver in FIG. 11 further comprises a random sequence generator 1108.

Referring to FIG. 11, the receiver includes a plurality of receive antennas, e.g., a first receive antenna 1100 to a $P^{th}$ receive antenna 1102, a plurality of OFDM modulators, e.g., a first OFDM demodulator 1104 to a $P^{th}$ OFDM demodulator 1106, the random sequence generator 1108 for storing random sequences, a channel estimator 1110, a channel response matrix generator 1112, a signal combiner 1114, and at least one signal determiner, e.g., a first signal determiner 1116 and a second signal determiner 1118. It is assumed that the number of receive antennas is different from that of transmit antennas in the transmitter, but the scope of the present invention is not limited to this example. For example, the number of transmit antennas in the transmitter may be identical to that of receive antennas.

Hereinafter, a preferred embodiment for the operation of the receiver having the construction as illustrated in FIG. 11 will be described. More specifically, the receiver in FIG. 11 is characterized in that it has the same structure as that of the receiver of FIG. 7, except for the random sequence generator 1108. Accordingly, in describing FIG. 11, elements identical to those of the receiver in FIG. 7 will be briefly described or a description on the elements will be omitted, and the random sequence generator 1108 will be described in detail.

Referring to FIG. 11, the signals transmitted through the transmit antennas of the transmitter, e.g., the first antenna 920, the second antenna 922, the third antenna 924, and the fourth antenna 926 are received through the receive antennas, e.g., the first receive antenna 1100 to the $P^{th}$ receive antenna 1102. The first receive antenna 1100 to the $P^{th}$ receive antenna 1102 output the received signals to corresponding OFDM modulators, e.g., the first OFDM demodulator 1104 to the $P^{th}$ OFDM demodulator 1106, respectively.

Each of the first OFDM demodulator 1104 to the $P^{th}$ OFDM demodulator 1106 converts the signals received through the corresponding receive antennas 1100 to 1102 into baseband signals, performs an FFT for the baseband signals, performs an OFDM demodulation for the FFTed signals, and outputs OFDM demodulated data. Each of the first OFDM demodulator 1104 to the $P^{th}$ OFDM demodulator 1106 outputs the OFDM demodulated data to the random sequence generator 1108. Hereinafter, the output signals of the OFDM modulators 1104 to 1106 will be described based on an assumption that one antenna exists in the receiver.

More specifically, the signals mapped to the first antenna 920, the second antenna 922, the third antenna 924, and the fourth antenna 926 correspond to [$r_1$, 0, $r_3$, 0], [$-r_3^*$, 0, $r_1^*$, 0], [0, $r_2$, 0, $r_4$], and [0, $-r_4^*$, 0, $r_4^*$], respectively. The transmitted signals are received in the receiver through channels and demodulated by the demodulator. The random sequence used in the transmitter is {1, 3, 4, 2} and is also stored in the random sequence generator 1108 of the receiver. The random sequence generator 1108 bundles signals of the first sub-carrier and the third sub-carrier and bundles signals of the fourth sub-carrier and the second sub-carrier based on the stored random sequence {1, 3, 4, 2}. This signal bundle is applied to the channel estimator 1110, the channel response matrix generator 1112, the signal combiner 1114, the first signal determiner 1116, and the second signal determiner 1118 as illustrated in FIG. 11 in the same manner.

Because processes subsequent to the process are identical to those of the receiver in FIG. 7, a detailed description will be omitted here.

4. Receiver Operation

Figure 12:
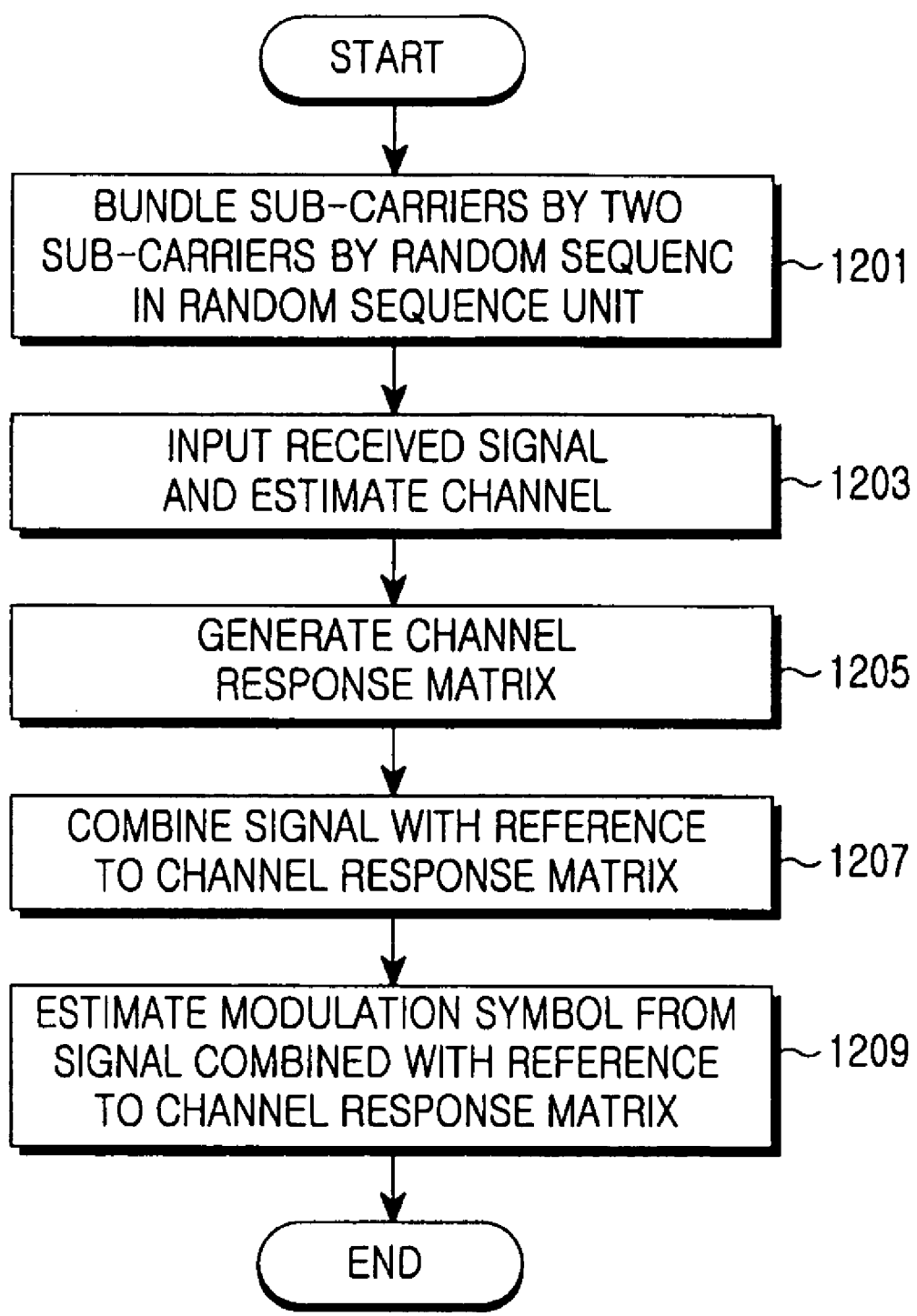
FIG. 12 is a flow diagram illustrating a reception process of a receiver in an OFDM communication system using an SFBC scheme according to an embodiment of the present invention.

FIG. 12 is a flow diagram illustrating a reception process of the receiver in the OFDM communication system using the SFBC scheme according to an embodiment of the present invention. Referring to FIG. 12, in step 1201, the receiver bundles sub-carriers by two sub-carriers through the random sequence stored in the random sequence generator 1108. In step 1203, the receiver performs an OFDM demodulation for the signals received through the receive antennas, and estimates channel coefficients representing channel gain between the transmitter and the receiver by means of the OFDM demodulated signals.

In step 1205, the receiver generates a channel response matrix $H_{new}$ by means of the estimated channel coefficients. In step 1207, the receiver combines the OFDM demodulated signals with the channel response matrix $H_{new}$ according to a predetermined rule, and generates a vector including $N_t$ symbols.

In step 1209, the receiver divides the generated vector into two vectors, performs maximum likelihood decoding by means of the two vectors and the channel response matrix $H_{new}$, thereby determining the symbols transmitted from the transmitter.

Figure 13:
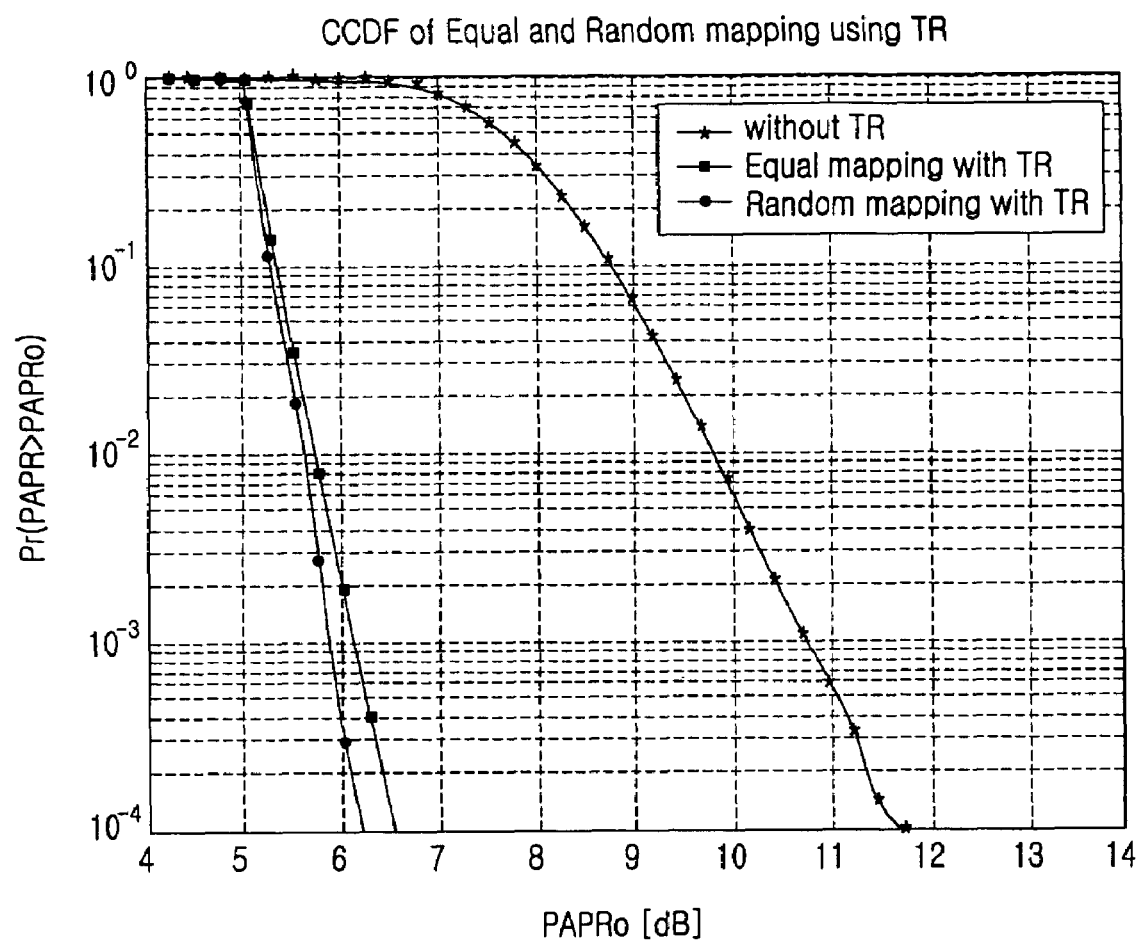
FIG. 13 is a graph illustrating a PAPR reduction performance curve in an OFDM communication system using an SFBC scheme according to embodiments of the present invention.

FIG. 13 is a graph illustrating the PAPR reduction performance curve when the TR scheme has been applied in the OFDM communication system using the SFBC scheme according to the embodiments of the present invention. More specifically, FIG. 13 illustrates a performance analysis result when the TR scheme has been applied, which reserves 26 sub-carriers and reduces the PAPR in the MIMO-OFDM system having 256 sub-carriers.

As illustrated in FIG. 13, when the TR scheme has not been applied in a general method, the PAPR has a very large value of 11.7 dB at $10^{-4}$. However, when the TR scheme has been applied, the PAPR is greatly reduced. That is, at $10^{-4}$, the PAPR is reduced to 6.5 dB in the equal interval mapping method and the PAPR is reduced to 6.2 dB in the random mapping method. Further, the random mapping method has a performance gain of 0.3 dB than the equal interval mapping method.

Table 1 below shows a comparison of the PAPR reduction performance for the adjacent mapping and the random mapping when the TR scheme has not been applied and the TR scheme has been applied.

TABLE 1

|  |  | PAPR ($10^{-4}$) dB |
|---|---|---|
| Non-application of TR |  | 11.7 dB |
| Application of TR | adjacent mapping | 6.5 dB |
|  | random mapping | 6.2 dB |

According to an apparatus and a method for minimizing a PAPR in an OFDM communication system of the present invention, it is possible to minimize the PAPR by an SFBC scheme for being applied to the OFDM communication system and a receiver can exactly restore data. Further, a receiver according to the present invention can use an existing receiver and perform a random mapping in an SFBC scheme, so that a PAPR can be minimized.

Although preferred embodiments of the present invention have been described for illustrative purposes, those skilled in the art will appreciate that various modifications, additions, and substitutions are possible, without departing from the scope and spirit of the present invention as disclosed in the accompanying claims, including the full scope of equivalents thereof.

What is claimed is:

1. A transmitter for minimizing a Peak-to-Average Power Ratio (PAPR) in a multi carrier communication system, the transmitter comprising:
    at least one transmit antenna; a precoder for coding input symbols so that signal rotation is generated, and generating a complex vector including the coded symbols;
    an encoder for performing a frequency-space mapping for the symbols generated as the complex vector according to an Alamouti scheme;
    a random mapper for randomly mapping the symbols for which the frequency-space mapping has been performed on a frequency plane through said at least one transmit antenna, and for performing a random selection of the symbols for adjacent sub-carriers;
    an Inverse Fast Fourier Transform (IFFT) unit for performing an IFFT for the symbols for which the frequency-space mapping has been performed; and
    a gradient algorithm unit for receiving IFFTed signals from the IFFT unit and for reducing the PAPR,
    wherein the gradient algorithm unit comprises:
    a P-waveform generator for receiving a predetermined number of tones having reserved positions among a total number of tone signals, and for generating a P-waveform having impulse characteristics;
    a peak detector for detecting a maximum peak value of complex output signals x after the IFFT;
    a position circulation movement unit for circularly moving a position of the P-waveform to a position of the detected maximum peak value;
    a phase rotator for harmonizing the circularly moved P-waveform with the phase of the maximum peak value detected on a complex plane;
    a scaling unit for scaling a value of the P-waveform such that it is smaller than a system setup PAPR; and
    a complex adder for performing complex addition for the complex output signals x after the IFFT and the scaled value,
    wherein the P-waveform is selected by repeating, a predetermined number of times, a process for randomly selecting the predetermined number of tones having positions reserved among the total number of tone signals, and
    wherein in the selection process, a value having a smallest power value is selected from remaining values except for a peak value from among values generated through the repetition.

2. The transmitter as claimed in claim 1, wherein the random mapper generates a predetermined number of vectors by bundling the symbols constituting a precoded symbol sequence by a predetermined number of symbols using a random sequence.

3. The transmitter as claimed in claim 1, wherein the gradient algorithm unit further comprises:
    a PAPR operator for calculating the PAPR of a result output from the complex adder; and
    a controller for comparing a value output from the PAPR operator with the system setup PAPR and controlling signal output based on the comparison.

4. A transmitter for minimizing a Peak-to-Average Power Ratio (PAPR) in a multi carrier communication system, the transmitter comprising:

at least one transmit antenna;
a precoder for coding input symbols so that signal rotation is generated, and generating a complex vector including the coded symbols;
an encoder for separating the symbols output from the precoder so as to generate a predetermined number of vectors, encoding the generated vectors by an Alamouti scheme, performing a frequency-space mapping for the encoded vectors, and randomly mapping the symbols for which the frequency-space mapping has been performed on a frequency plane through said at least one transmit antenna by a random selection of the symbols for adjacent sub-carriers;
an Inverse Fast Fourier Transform (IFFT) unit for performing an IFFT for the symbols for which the frequency-space mapping has been performed; and
a gradient algorithm unit for receiving IFFTed signals from the IFFT unit and reducing the PAPR,
wherein the gradient algorithm unit comprises:
a P-waveform generator for receiving a predetermined number of tones having positions reserved among a total number of tone signals, and generating a P-waveform having impulse characteristics;
a peak detector for detecting a maximum peak value of complex output signals x after the IFFT;
a position circulation movement unit for circularly moving a position of the P-waveform to a position of the detected maximum peak value;
a phase rotator for harmonizing the circularly moved P-waveform with the phase of the maximum peak value detected on a complex plane;
a scaling unit for scaling a value of the P-waveform so that the peak value of the complex output signals x after the IFFT is smaller than a system setup PAPR; and
a complex adder for performing complex addition for the complex output signals x after the IFFT and the scaled value,
wherein the P-waveform is selected by repeating, a predetermined number of times, a process for randomly selecting the predetermined number of tones having positions reserved among the total number of tone signals, and
wherein in the selection process, a value having a smallest power value is selected from remaining values except for a peak value from among values generated through the repetition.

5. The transmitter as claimed in claim 4, wherein the encoder, generates a predetermined number of vectors by bundling the symbols constituting a precoded symbol sequence by a predetermined number of symbols using a random sequence.

6. The transmitter as claimed in claim 4, wherein the gradient algorithm unit further comprises a PAPR operator for calculating the PAPR of a result output from the complex adder,
a controller for comparing a value output from the PAPR operator with the system setup PAPR and controlling signal output based on the comparison.

7. A transmission method in a transmitter for minimizing a Peak-to-Average Power Ratio (PAPR) in a multi carrier communication system, the transmitter including at least one transmit antenna, the method comprising the steps of:
receiving a data sequence to be transmitted;
generating, by a precoder, a precoded symbol sequence with the received data sequence through precoding using a preset precoding matrix;
separating, by an encoder, the generated precoded symbol sequence to generate a predetermined number of vectors;
encoding, by the encoder, the generated vectors according to an Alamouti scheme;
randomly mapping, by a random mapper, the encoded vectors on a frequency plane by a random selection is performed to each of adjacent sub-carriers;
performing, by an Inverse Fast Fourier Transform(IFFT) unit, an Inverse Fast Fourier Transform (IFFT) for the symbols for which the frequency-space mapping has been performed;
outputting IFFTed signals;
receiving, by a gradient algorithm unit, the IFFTed signals and reducing the PAPR; and
transmitting signals having the reduced PAPR through said at least one transmit antenna,
wherein the step of reducing the PAPR comprises the steps of:
generating a P-waveform having impulse characteristics with a predetermined number of tones having reserved positions from among total multi-carriers;
performing the IFFT for the generated P-waveform to output signals on a time domain;
detecting a peak value of the output signals;
harmonizing phases by circularly moving the generated P-waveform to a position of the detected peak value;
determining a scaling value of the P-waveform such that the scaling value is smaller than a system setup PAPR;
performing a complex operation for the determined scaling value and the output signals;
ending output of a value obtained through the complex operation and repetition performance, when the value is smaller than the system setup PAPR; and
continuing the repetition performance by a preset number of repetitions, when the value is larger than the system setup PAPR.

8. The method as claimed in claim 7, wherein, in the encoding and the random mapping, adjacent random sequences are separated into predetermined groups, and the predecoded symbol sequence is mapped to a sub-carrier by means of a random sequence.

9. The method as claimed in claim 7, wherein the tones having the reserved positions are selected from sub-carriers not transmitting data by a predetermined number.

10. The method as claimed in claim 7, wherein the step of detecting the peak of the output signals comprises detecting a position of a peak value having deviated from a PAPR of a preset system setup value.

11. The method as claimed in claim 7, wherein the circularly moved phase is obtained by normalizing a maximum peak value and a phase of the P-waveform having the impulse characteristics is rotated by a phase of the maximum peak value.

* * * * *

UNITED STATES PATENT AND TRADEMARK OFFICE
CERTIFICATE OF CORRECTION

PATENT NO.       : 7,664,192 B2
APPLICATION NO.  : 11/247787
DATED            : February 16, 2010
INVENTOR(S)      : Yun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this

Thirtieth Day of November, 2010

David J. Kappos
*Director of the United States Patent and Trademark Office*